(12) United States Patent
Bai et al.

(10) Patent No.: US 12,087,290 B2
(45) Date of Patent: Sep. 10, 2024

(54) DATA PROCESSING METHOD BASED ON SIMULTANEOUS INTERPRETATION, COMPUTER DEVICE, AND STORAGE MEDIUM

(71) Applicant: TENCENT TECHNOLOGY (SHENZHEN) COMPANY LIMITED, Shenzhen (CN)

(72) Inventors: Jingliang Bai, Shenzhen (CN); Caisheng Ouyang, Shenzhen (CN); Haikang Liu, Shenzhen (CN); Lianwu Chen, Shenzhen (CN); Qi Chen, Shenzhen (CN); Yulu Zhang, Shenzhen (CN); Min Luo, Shenzhen (CN); Dan Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 171 days.

(21) Appl. No.: 16/941,503

(22) Filed: Jul. 28, 2020

(65) Prior Publication Data

US 2020/0357389 A1 Nov. 12, 2020

Related U.S. Application Data

(63) Continuation of application No. PCT/CN2019/080027, filed on Mar. 28, 2019.

(30) Foreign Application Priority Data

May 10, 2018 (CN) .......................... 201810443090.X

(51) Int. Cl.
*G10L 15/183* (2013.01)
*G10L 15/06* (2013.01)
(Continued)

(52) U.S. Cl.
CPC .......... *G10L 15/183* (2013.01); *G10L 15/063* (2013.01); *G10L 15/22* (2013.01);
(Continued)

(58) Field of Classification Search
CPC ... G10L 15/183; G10L 15/30; G10L 21/0232; G10L 25/21; G10L 15/06; G10L 25/84; G10L 15/22; G10L 15/063
See application file for complete search history.

(56) References Cited

U.S. PATENT DOCUMENTS 6,529,866 B1 * 3/2003 Cope ....................... G10L 15/20
704/205
6,757,655 B1 6/2004 Besling et al.
(Continued)

FOREIGN PATENT DOCUMENTS

CN 2884704 Y 3/2007
CN 101458681 A 6/2009
(Continued)

OTHER PUBLICATIONS

The European Patent Office (EPO) the Extended European Search Report for 19799122.7 Jun. 1, 2021 7 Pages.
(Continued)

*Primary Examiner* — Richemond Dorvil
*Assistant Examiner* — Ethan Daniel Kim
(74) *Attorney, Agent, or Firm* — ANOVA LAW GROUP, PLLC

(57) ABSTRACT

A data processing method based on simultaneous interpretation, applied to a server in a simultaneous interpretation system, including: obtaining audio transmitted by a simultaneous interpretation device; processing the audio by using a simultaneous interpretation model to obtain an initial text; transmitting the initial text to a user terminal; receiving a modified text fed back by the user terminal, the modified text
(Continued)

being obtained after the user terminal modifies the initial text; and updating the simultaneous interpretation model according to the initial text and the modified text.

20 Claims, 15 Drawing Sheets

(51) Int. Cl.
*G10L 15/22* (2006.01)
*G10L 15/30* (2013.01)
*G10L 21/0232* (2013.01)
*G10L 25/21* (2013.01)
*G10L 25/84* (2013.01)
*G10L 25/78* (2013.01)

(52) U.S. Cl.
CPC .......... *G10L 15/30* (2013.01); *G10L 21/0232* (2013.01); *G10L 25/21* (2013.01); *G10L 25/84* (2013.01); *G10L 2015/0636* (2013.01); *G10L 2025/783* (2013.01)

(56) References Cited

U.S. PATENT DOCUMENTS

| | | | |
|---|---|---|---|
| 2006/0271352 | A1 | 11/2006 | Nikitin et al. |
| 2009/0150139 | A1 | 6/2009 | Jianfeng et al. |
| 2010/0317420 | A1* | 12/2010 | Hoffberg ............... A63F 9/24 463/1 |
| 2011/0206198 | A1* | 8/2011 | Freedman ............... H04M 3/00 379/265.03 |
| 2011/0307241 | A1 | 12/2011 | Waibel et al. |
| 2016/0026730 | A1* | 1/2016 | Hasan .................... G06F 17/30 |
| 2016/0147740 | A1 | 5/2016 | Gao et al. |
| 2016/0342669 | A1* | 11/2016 | Hein ..................... G06F 17/30 |
| 2016/0379626 | A1 | 12/2016 | Deisher et al. |
| 2018/0121393 | A1* | 5/2018 | Masalovitch .......... G06F 17/21 |
| 2019/0103097 | A1 | 4/2019 | Li |
| 2019/0182382 | A1* | 6/2019 | Mazza ................. H04M 3/527 |

FOREIGN PATENT DOCUMENTS

| | | |
|---|---|---|
| CN | 101542474 A | 9/2009 |
| CN | 101697581 A | 4/2010 |
| CN | 102360347 A | 2/2012 |
| CN | 103885783 A | 6/2014 |
| CN | 103929666 A | 7/2014 |
| CN | 104462186 A | 3/2015 |
| CN | 105159870 A | 12/2015 |
| CN | 105512113 A | 4/2016 |
| CN | 105551488 A | 5/2016 |
| CN | 105589850 A | 5/2016 |
| CN | 106486125 A | 3/2017 |
| CN | 107660303 A | 2/2018 |
| CN | 107678561 A | 2/2018 |
| CN | 108615527 A | 10/2018 |
| DE | 19910236 A1 | 9/2000 |
| KR | 20160081244 A | 7/2016 |

OTHER PUBLICATIONS

The World Intellectual Property Organization (WIPO) International Search Report for PCT/CN2019/080027 Jun. 28, 2019 5 Pages (including translation).

The State Intellectual Property Office of the People's Republic of China (SIPO) Office Action 1 for 201810443090.X Apr. 3, 2020 9 Pages (including translation).

The State Intellectual Property Office of the People's Republic of China (SIPO) Office Action 2 for 201810443090.X Feb. 5, 2021 9 Pages (including translation).

* cited by examiner

DATA PROCESSING METHOD BASED ON SIMULTANEOUS INTERPRETATION, COMPUTER DEVICE, AND STORAGE MEDIUM

CROSS-REFERENCES TO RELATED APPLICATIONS

This application is a continuation application of PCT Patent Application No. PCT/CN2019/080027, filed on Mar. 28, 2019, which claims priority to Chinese Patent Application No. 201810443090.X, entitled "DATA PROCESSING METHOD BASED ON SIMULTANEOUS INTERPRETATION, APPARATUS, AND STORAGE MEDIUM" filed with the National Intellectual Property Administration, PRC on May 10, 2018, both of which are incorporated herein by reference in their entirety.

FIELD OF THE TECHNOLOGY

The present disclosure relates to the field of simultaneous interpretation technologies, and in particular, to a data processing method based on simultaneous interpretation, a computer device, and a storage medium.

BACKGROUND OF THE DISCLOSURE

Simultaneous interpretation, SI for short, refers to translating speech content to audiences in real time without interrupting a speaker's speech. Currently, 95% of international conferences in the world adopt the simultaneous interpretation.

In technical solutions of simultaneous interpretation in the related art, a common simultaneous interpretation method includes: acquiring, by a simultaneous interpretation device, audio produced by a speaker, and uploading the acquired audio to a server; processing, by the server, the received audio to obtain a corresponding text; and displaying the text on a display screen of a simultaneous interpretation system.

However, in the technical solution of the simultaneous interpretation in the related art, an error is likely to occur in the text obtained by the server by processing the audio, which seriously affects the accuracy of text content in the simultaneous interpretation.

SUMMARY

Embodiments of the present disclosure provide a data processing method based on simultaneous interpretation, a computer device, and a storage medium, so as to resolve a problem that the accuracy of text content in simultaneous interpretation in the related art is low.

An embodiment of the present disclosure provides a data processing method based on simultaneous interpretation. The method is applied to a server in a simultaneous interpretation system, including: obtaining audio transmitted by a simultaneous interpretation device; processing the audio by using a simultaneous interpretation model to obtain an initial text; transmitting the initial text to a user terminal; receiving a modified text fed back by the user terminal, the modified text being obtained after the user terminal modifies the initial text; and updating the simultaneous interpretation model according to the initial text and the modified text.

An embodiment of the present disclosure provides a storage medium, storing a computer program, the computer program, when executed by a processor, causing the processor to perform: obtaining audio transmitted by a simultaneous interpretation device; processing the audio by using a simultaneous interpretation model to obtain an initial text; transmitting the initial text to a user terminal; receiving a modified text fed back by the user terminal, the modified text being obtained after the user terminal modifies the initial text; and updating the simultaneous interpretation model according to the initial text and the modified text.

An embodiment of the present disclosure provides a computer device, including a memory and a processor, the memory storing a computer program, the computer program, when executed by a processor, causing the processor to perform: obtaining audio transmitted by a simultaneous interpretation device; processing the audio by using a simultaneous interpretation model to obtain an initial text; transmitting the initial text to a user terminal; receiving a modified text fed back by the user terminal, the modified text being obtained after the user terminal modifies the initial text; and updating the simultaneous interpretation model according to the initial text and the modified text.

Other aspects of the present disclosure can be understood by those skilled in the art in light of the description, the claims, and the drawings of the present disclosure.

DESCRIPTION OF EMBODIMENTS

To make the objectives, technical solutions, and advantages of the present disclosure clearer, the following further describes the present disclosure in detail with reference to the accompanying drawings and the embodiments. The specific embodiments described herein are merely used for explaining the present disclosure but are not intended to limit the present disclosure.

Figure 1:
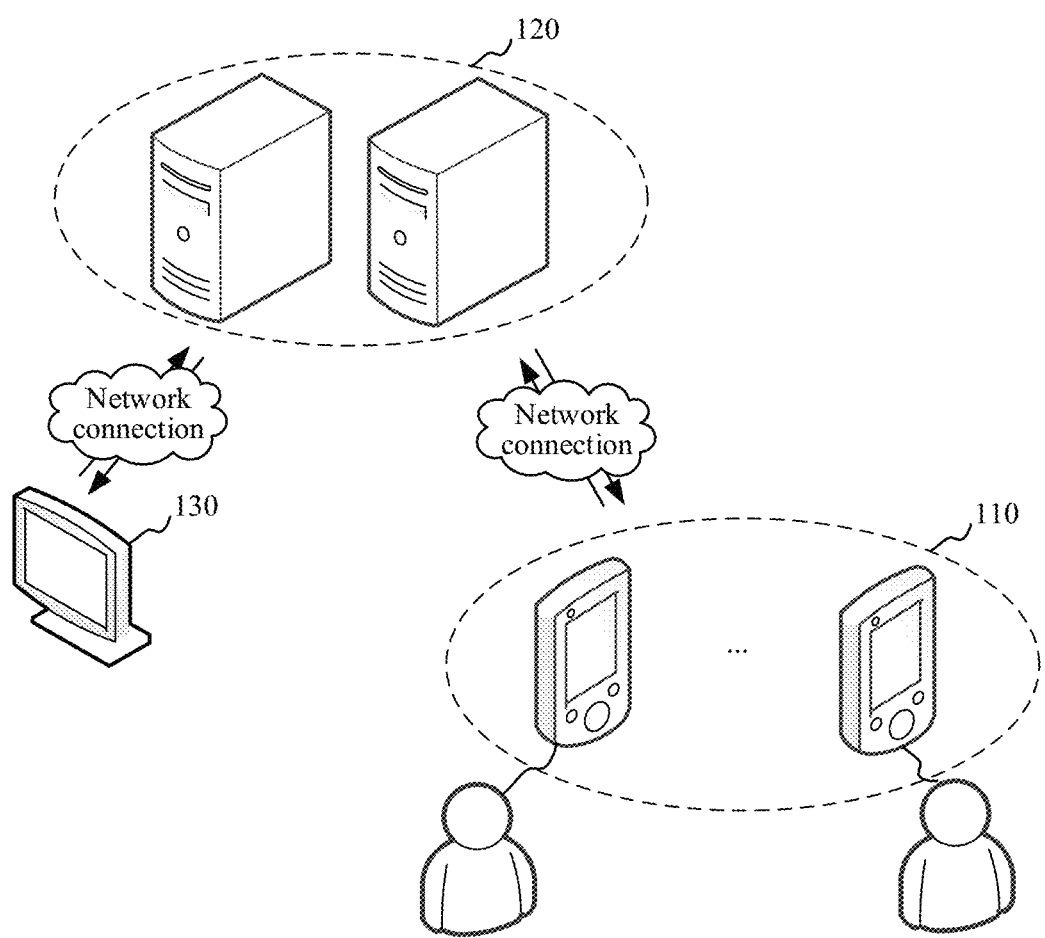
FIG. 1 is a diagram of an application environment of a data processing method based on simultaneous interpretation in an embodiment.

FIG. 1 is a diagram of an application environment of a data processing method based on simultaneous interpretation in an embodiment. Referring to FIG. 1, the data processing method based on simultaneous interpretation is applied to a simultaneous interpretation system. The simultaneous interpretation system includes a user terminal 110, a server 120, and a simultaneous interpretation device 130. The user terminal 110 and the simultaneous interpretation device 130 are connected to the server 120 through a network.

The user terminal 110 may be a desktop terminal or a mobile terminal, and the mobile terminal may be at least one of a mobile phone, a tablet computer, a notebook computer, and the like. The server 120 may be implemented by using an independent server or a server cluster that includes a plurality of servers. This is not specifically limited in this embodiment of the present disclosure. In an example, when the server 120 is a plurality of servers, a voice server and a translation server may be included. The simultaneous interpretation device 130 may be a terminal having an audio acquisition function, such as a notebook computer, a desktop computer with a microphone, or the like.

Figure 2:
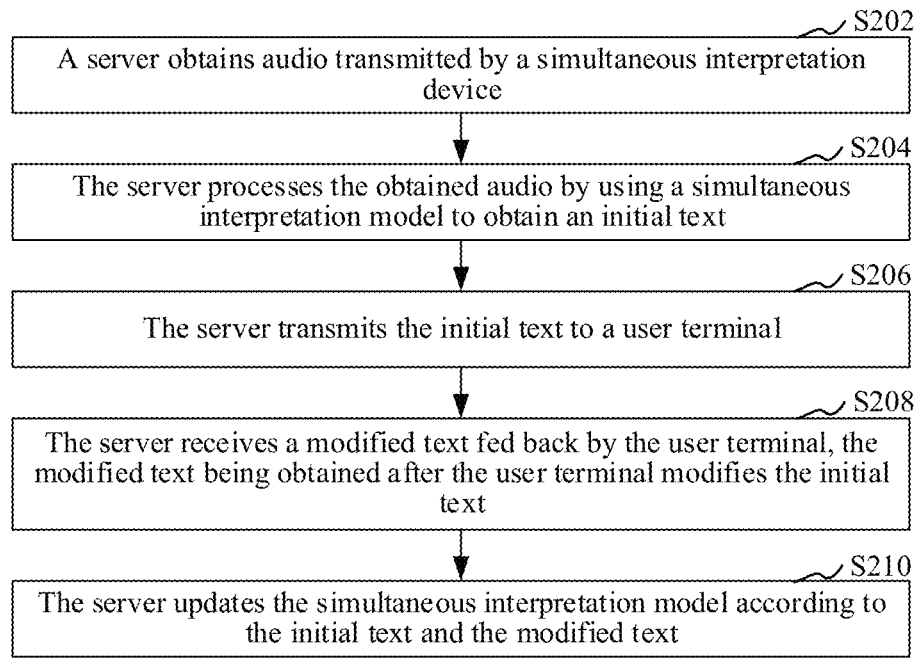
FIG. 2 is a schematic flowchart of a data processing method based on simultaneous interpretation in an embodiment.
Figure 3:
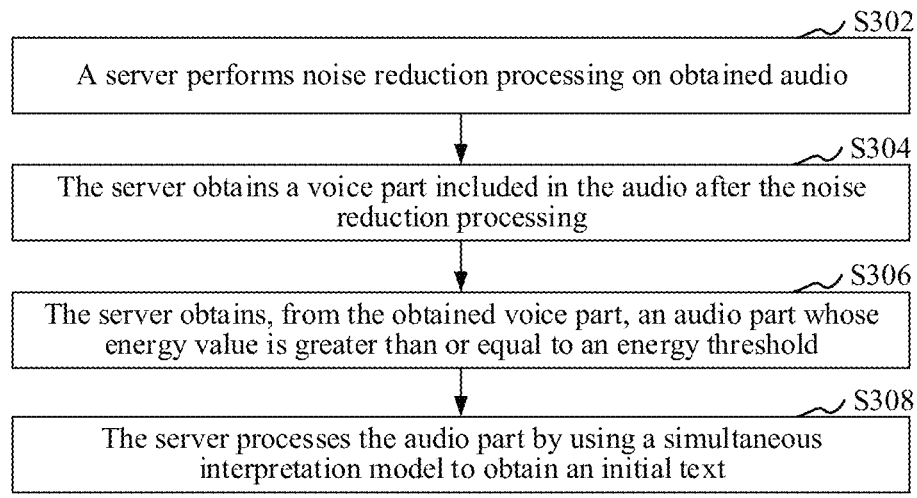
FIG. 3 is a schematic flowchart of steps of audio processing and speech recognition in an embodiment.

As shown in FIG. 2, in an embodiment, a data processing method based on simultaneous interpretation is provided. Some embodiments are described by using an example in which the method is applied to the server 120 in FIG. 1. Referring to FIG. 2, the data processing method based on simultaneous interpretation includes the following steps:

S202. The server obtains audio transmitted by a simultaneous interpretation device.

The audio refers to audio produced by a speaker during a speech in the simultaneous interpretation process.

In an embodiment, before S202, the method further includes: when receiving a connection request carrying a user identifier that is transmitted by a user terminal, determining, by the server, whether the user identifier has a permission to access a simultaneous interpretation conference. If it is determined that the user identifier has the permission to access the simultaneous interpretation conference, the server establishes a communications connection with the user terminal. If it is determined that the user identifier does not have the permission to access the simultaneous interpretation conference, the server refuses to establish the communications connection with the user terminal.

The communications connection may be a Transmission Control Protocol (TCP) connection, a User Datagram Protocol (UDP) connection, a WebSocket connection, or the like. This is not specifically limited in this embodiment of the present disclosure.

In an embodiment, the method of obtaining audio may include: acquiring, by the simultaneous interpretation device, external audio, and transmitting, by the simultaneous interpretation device, the acquired audio to the server, so that the server obtains the audio. Alternatively, when acquiring the external audio, after performing noise reduction processing on the audio, the simultaneous interpretation device performs power amplification on the noise-reduced audio, performs voice activity detection on the amplified audio, removes non-voice audio through filtering, and then transmits audio from which the non-voice component has been removed to the server, so that the server obtains the audio.

S204. The server processes the obtained audio by using a simultaneous interpretation model to obtain an initial text.

The simultaneous interpretation model is used for processing the obtained audio, for example, speech recognition and translation of a recognized result. In an example, the simultaneous interpretation model may include a voice model and a translation model. The voice model includes a universal voice model and an auxiliary voice model.

The universal voice model is used for performing speech recognition on the audio to obtain a corresponding recognized text. The auxiliary voice model is used for correcting the recognized text. That is, when the recognized text has an error the same as an error that has occurred previously, the error is corrected. The translation model is used for translating the recognized text to obtain a translation text.

In an example, the initial text refers to the recognized text and the translation text. That is, the initial text obtained by processing the audio includes: the recognized text and the translation text. The recognized text is a text obtained by performing speech recognition on the audio. The translation text is a text of a target language obtained by translating the recognized text, and may be referred to as a translation.

In addition, the initial text may further include a recognition update text obtained after the recognized text is modified. The recognition update text may alternatively be referred to as an updated recognized text.

In an embodiment, the server performs speech recognition on the obtained audio by using the simultaneous interpretation model to obtain a recognized text after the speech recognition. The server translates the recognized text by using the simultaneous interpretation model to obtain a translation text of a target language, and determines the recognized text and the translation text as the initial text obtained by processing the audio.

In an embodiment, the server processes a received complete speech to obtain the initial text. The complete speech may be a speech of a preset duration, or may be a speech of a speaker from the beginning of speaking to a sentence pause. For example, the speaker says "Ladies and gentlemen, good evening." In this speech, the speaker pauses after saying "good evening". In this case, the complete speech may be "ladies and gentlemen, good evening".

S206. The server transmits the initial text to a user terminal.

In an example, the server transmits the text to the user terminal, and the transmitted text is used for instructing the user terminal to display the received text in a simultaneous interpretation auxiliary page, so that audiences in a simultaneous interpretation conference can view text content of the simultaneous interpretation through the user terminal. In some embodiments, user terminals of same group identifier may all receive the initial text. The user terminals of same group identifier may refer to user terminals in a same speech/conference session and selected a same target translation language.

In an embodiment, after the server processes an audio segment to obtain a corresponding text each time, the server transmits the obtained text to the user terminal. The foregoing audio segment may be a speech made by the speaker, where a duration of the speech is within a certain time range, such as one minute or half a minute.

In an embodiment, after the server processes an audio segment to obtain a corresponding text each time, if it is determined that a quantity of words of the text reaches a preset word quantity threshold, the server transmits the text to the user terminal.

S208. The server receives a modified text fed back by the user terminal, the modified text being obtained after the user terminal modifies the initial text. In some embodiments, the modified text may be entered on the user terminal based on the simultaneous interpretation auxiliary page.

The text transmitted by the server may include both the recognized text and the translation text. Therefore, the modified text may be a text obtained through modification based on the recognized text, or may be a text obtained through modification based on the translation text. The modifying the text may be modifying a character, a word, a sentence, or the text as a whole.

That is, the server receives the modified text that is fed back by the user terminal and that is obtained by modifying the recognized text. Alternatively, the server receives the modified text that is fed back by the user terminal and that is obtained by modifying the translation text.

S210. The server updates the simultaneous interpretation model according to the initial text and the modified text. In some embodiments, the updated SI model may just be used in subsequent interpretations in the same conference/speech session (e.g., same group identifier). For example, if multiple user terminals modify (or an expert user terminal modifies) an initial text T1 corresponding to an audio component A1 to a modified text T2 (e.g., a weighted cumulative value for translation text modification reaches a threshold), after updating the SI model, when the audio component A2 occurs again in the same conference session, the server obtains text T2 based on the updated SI model and transmits text T2 to user terminals with same group identifier.

In an embodiment, the simultaneous interpretation model includes the voice model and the translation model. Therefore, when a weighted cumulative value reaches a threshold, and the modified text is obtained through modification based on the recognized text, the server may update the voice model according to the recognized text and the modified text. When the weighted cumulative value reaches the threshold, and the modified text is obtained through modification based on the translation text, the server may update the translation model according to the translation text and the modified text.

The weighted cumulative value reaching the threshold means that the weighted cumulative value is greater than or equal to the threshold. In an embodiment, after determining the weighted cumulative value of the modified text according to a weight corresponding to a user terminal identifier, the server compares the weighted cumulative value with the preset threshold.

In the foregoing data processing method based on simultaneous interpretation, the server receives the modified text that is obtained by modifying the initial text and that is fed back by the user terminal, so that corresponding feedback can be obtained in time when the initial text is modified. In addition, after the simultaneous interpretation model is updated according to the initial text and the modified text, the audio is then processed subsequently by using the updated simultaneous interpretation model, so that the accuracy of the text obtained by processing the audio is improved.

In an embodiment, S204 may include the following steps:

S302. The server performs noise reduction processing on the obtained audio.

In an embodiment, the server performs the noise reduction processing on the obtained audio by using a noise reduction algorithm. The noise reduction algorithm may include a Wiener filtering noise reduction algorithm, a basic spectral subtraction algorithm, an LMS adaptive notch algorithm, or the like.

In an embodiment, after performing the noise reduction processing on the obtained audio, the server may further perform power amplification processing on the noise-reduced audio.

S304. The server obtains a voice component included in the audio after the noise reduction processing.

The audio may include the voice component and a non-voice component.

In an embodiment, the server may further perform voice activity detection on the audio after the noise reduction processing, or the audio after the noise reduction and power amplification processing, to determine whether there is a non-voice component in the audio. When it is determined that there is a non-voice component in the audio, the non-voice component is deleted, so as to obtain the voice component in the audio.

S306. The server obtains, from the obtained voice component, an audio component whose energy value is greater than or equal to an energy threshold.

In the process of the speech of the speaker, there may be others talking. Therefore, in the audio from which the non-voice component has been deleted, there may also be other people's audio in addition to the speaker's audio. Energy of the other people's audio is less than energy of the speaker's audio. Therefore, the server may perform energy detection on the obtained voice component, to obtain, from the obtained voice component, the audio component whose energy value is greater than or equal to the energy threshold.

S308. The server processes the audio component by using the simultaneous interpretation model to obtain the initial text.

In an embodiment, the server performs, by using a speech recognition algorithm, speech recognition on the audio component obtained in step S306 to obtain the initial text.

In the foregoing data processing method based on simultaneous interpretation, the server performs noise reduction on the obtained audio, to help improve the accuracy of the speech recognition. In addition, the voice component in the audio after the noise reduction processing is obtained, which prevents the server from performing coding/decoding on whole audio in the speech recognition process, thereby improving the computing efficiency of the server. In addition, the audio component whose energy value is greater than or equal to the energy threshold is obtained from the obtained voice component, which prevents the other people's audio from interfering with the speaker's audio in the speech recognition process, thereby avoiding obtaining a text corresponding to a non-speaker's audio.

In an embodiment, the simultaneous interpretation model includes the universal voice model and the auxiliary voice model. The initial text includes at least one of the recognized text and the recognition update text.

The recognized text is obtained by performing speech recognition on the obtained audio by using the universal voice model. The recognition update text is obtained by updating the recognized text by using the auxiliary voice model. In other words, the processing the audio by using the simultaneous interpretation model to obtain an initial text includes: performing speech recognition on the audio by using the universal voice model to the recognized text, and updating the recognized text by using the auxiliary voice model to obtain the recognition update text. S210 may include: updating the auxiliary voice model according to the initial text and the modified text.

The universal voice model is used for performing speech recognition on the obtained audio to obtain the recognized text. The auxiliary voice model is used for updating the recognized text. For example, after the server updates the auxiliary voice model according to the initial text and the modified text, when the auxiliary voice model detects an error in the recognized text and the error has a corresponding modified text, the server updates the faulty recognized text by using the auxiliary voice model, that is, replaces the faulty recognized text with the modified text. When the auxiliary voice model does not detect an error in the recognized text, the server does not update the recognized text.

In an embodiment, after the updating the auxiliary voice model according to the initial text and the modified text, the method further includes: inputting, by the server, the obtained audio to the universal voice model, and recognizing the inputted audio to obtain the corresponding recognized text by using the universal voice model. The server inputs the recognized text obtained through recognition to the auxiliary voice model, and detects, by using the auxiliary voice model, whether the recognized text includes content corresponding to the modified text. If the recognized text includes the content corresponding to the modified text, the foregoing corresponding content is updated with the modified text.

In the data processing method based on simultaneous interpretation, the server updates the auxiliary voice model according to the initial text and the modified text, and performs update processing on a subsequent text by using the updated auxiliary voice model. That is, if the subsequent text includes content corresponding to the modified text, the corresponding content is replaced with the modified text, to prevent an error before the updating from appearing again, thereby improving the accuracy of the text obtained in the simultaneous interpretation.

In an embodiment, the simultaneous interpretation model includes the translation model. The initial text includes the translation text. The modified text includes a modified translation text. S210 may include: updating the translation model according to the translation text and the modified translation text.

In an embodiment, after the updating the translation model according to the translation text and the modified translation text, the method further includes: inputting, by the server, the recognized text or the recognition update text to the translation model, and updating, upon detecting that the recognized text or the recognition update text includes content corresponding to the modified translation text, the corresponding content with the modified translation text. In some embodiments, the modified translation text may replace the translation text corresponding to the same audio component.

In an embodiment, the translation model may include a universal translation model and an auxiliary translation model. The step of updating the translation model according to the translation text and the modified translation text may include: updating the auxiliary translation model according to the translation text and the modified translation text. After updating the auxiliary translation model, the server inputs the recognized text or the recognition update text to the universal translation model, and translates the recognized text or the recognition update text to the translation text by using the universal translation model. Then, the server inputs the translation text to the auxiliary translation model, and detects, by using the auxiliary translation model, whether the translation text includes content matching the modified translation text. If the translation text includes the content matching the modified translation text, the matching content is updated with the modified translation text, to obtain a final translation text.

In the data processing method based on simultaneous interpretation, the server updates the translation model according to the translation text and the modified translation text, and translates the subsequent text by using the updated translation model, to prevent the error before the updating from occurring again, thereby improving the accuracy of the text obtained in the simultaneous interpretation.

Figure 4:
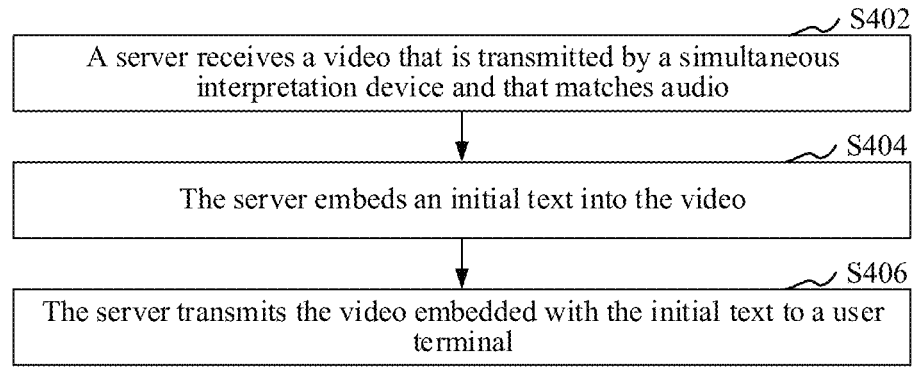
FIG. 4 is a schematic flowchart of steps of combining a text with a video and transmitting combined content to a user terminal for display in an embodiment.

In an embodiment, as shown in FIG. 4, the method further includes the following steps:

S402. The server receives a video that is transmitted by the simultaneous interpretation device and that matches the audio.

The video may be a speaker's video or a speaker's Power Point (PPT).

In an embodiment, the simultaneous interpretation device acquires a video matching the obtained audio, and transmits the acquired video to the server. The server receives the video acquired by the simultaneous interpretation device.

S404. The server embeds the initial text into the video.

In an embodiment, the server may embed the text into the video according to an occurrence time of the text in the video which is obtained by processing the audio. The occurrence time refers to a time at which the text appears in the video in a form of captions when the user terminal plays the video. In some embodiments, the server may provide translations in multiple languages and receives a selection from the user terminal about one or more target translation languages. The server may then, based on the selected target translation languages, embed one or more initial texts corresponding to the one or more selected target translation languages to the video.

In an embodiment, the server may embed the initial text into a bottom part, a middle part, or a top part of the video. The server may further set a quantity of lines of the initial text embedded into the video, for example, greater than or equal to two lines.

S406. The server transmits the video embedded with the initial text to the user terminal.

In an embodiment, the server transmits the video embedded with the text to the user terminal through a connection channel established between the server and the user terminal. The connection channel may be a TCP connection channel or a UDP connection channel.

After the text is embedded into the video, when the user terminal displays the video embedded with the text, the user may modify the embedded text through the user terminal.

In the foregoing data processing method based on simultaneous interpretation, the server embeds the text obtained in the simultaneous interpretation process into the video, and transmits the video embedded with the text to the user terminal. On one hand, a combination of the text and the video helps improve the audiences' understanding of the text. On the other hand, in addition to the text in the simultaneous interpretation, the audiences may also watch the video content, which enriches the content displayed by the user terminal.

Figure 5:
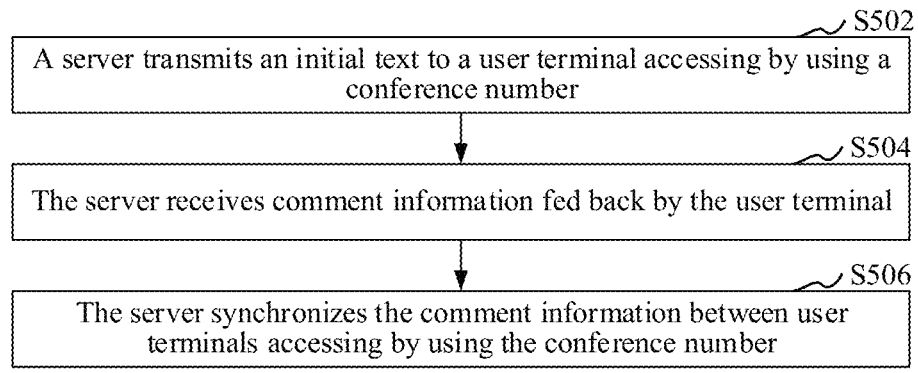
FIG. 5 is a schematic flowchart of steps of synchronizing a conference number to a user terminal in an embodiment.

In an embodiment, the audio obtained by the server corresponds to a group identifier. In an example, the group identifier refers to a conference number. As shown in FIG. 5, S206 may include the following steps:

S502. The server transmits the initial text to the user terminal accessing by using the conference number.

The conference number refers to a number in a simultaneous interpretation conference. In a simultaneous interpretation software system, a plurality of simultaneous interpretation conferences may be simultaneously supported, and different simultaneous interpretation conferences have different conference numbers.

In an embodiment, after the user terminal scans a two-dimensional code or a bar code in a conference room, the server establishes a communications connection with the user terminal, and transmits a simultaneous interpretation list to the user terminal, so that an audience holding the user terminal selects a conference number in the simultaneous interpretation list, and enters a corresponding simultaneous interpretation conference.

In an embodiment, the server receives an access request carrying a conference number and a user identifier from the user terminal, and determines, according to the user identifier, whether the user has a permission to access a simultaneous interpretation conference corresponding to the conference number. If the user has the permission to access the simultaneous interpretation conference corresponding to the conference number, the server allows access of the user terminal. If the user does not have the permission to access the simultaneous interpretation conference corresponding to the conference number, the server refuses the access of the user terminal. The user identifier may be a phone number or a social account.

S504. The server receives comment information fed back by the user terminal.

The comment information refers to comments made by the audiences in the process of viewing speech content of the speaker. The speech content includes the text obtained by processing the audio and the corresponding translation text.

S506. The server synchronizes the comment information between the user terminals accessing by using the conference number.

In an embodiment, the server determines connected user terminals according to the conference number, synchronizes the received comment information to all the determined user terminals, to instruct the user terminals to display the received comment information on the simultaneous interpretation auxiliary page in a form of barrages.

In the data processing method based on simultaneous interpretation, the server determines, according to the conference number, the user terminals for receiving the comment information. On one hand, the audiences may make comments through the user terminals, to enhance the interactivity between the users and the simultaneous interpretation system. On the other hand, it can be effectively avoided that the comment information is transmitted to user terminals of other simultaneous interpretation conferences.

Figure 6:
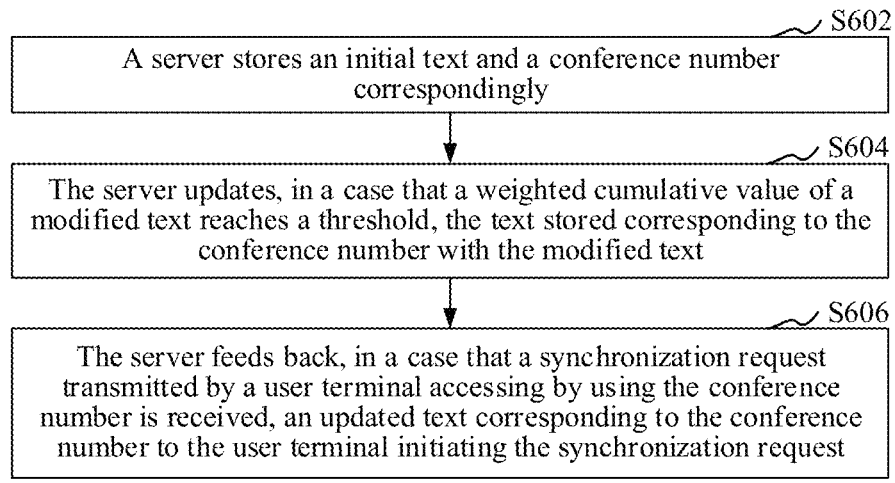
FIG. 6 is a schematic flowchart of steps of updating a stored text and feeding back an updated text to a user terminal in an embodiment.

In an embodiment, the audio obtained by the server corresponds to a group identifier. In an example, the group identifier refers to a conference number. S206 may include: transmitting the initial text to the user terminal accessing by using the conference number. As shown in FIG. 6, the method further includes the following steps:

S602. The server stores the initial text and the conference number correspondingly.

In an embodiment, after starting processing audio of a speaker to obtain a corresponding text, the server creates a document in a target format, adds the initial text to the document, establishes a mapping relationship between the document and the conference number, and stores the document and the conference number between which the mapping relationship is established. Then, after processing newly obtained audio to obtain a corresponding text, the server directly adds the text to the created document.

S604. The server updates, in a case that a weighted cumulative value of the modified text reaches a threshold, the text stored corresponding to the conference number with the modified text.

S606. The server feeds back, in a case that a synchronization request transmitted by the user terminal accessing by using the conference number is received, an updated text corresponding to the conference number to the user terminal initiating the synchronization request.

For the audiences of the simultaneous interpretation, a correct version of the text content may be downloaded timely.

In the data processing method based on simultaneous interpretation, the server updates the stored text according to the modified text, so as to ensure that the original text in which an error occurs can be corrected timely. When receiving the synchronization request of the user terminal, the server transmits the updated text to the user terminal, so as to ensure that the text obtained by the user terminal is the updated correct text, thereby improving the accuracy of the text.

Figure 7:
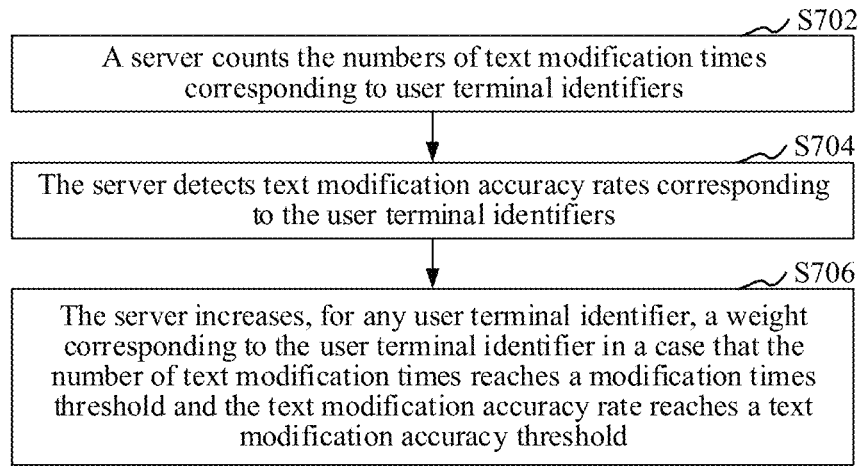
FIG. 7 is a schematic flowchart of steps of adjusting a weight corresponding to a user terminal identifier in an embodiment.

In an embodiment, as shown in FIG. 7, the method further includes the following steps:

S702. The server counts the numbers of text modification times corresponding to user terminal identifiers. In other words, the server counts times of text modifications corresponding to user terminal identifiers.

The number of text modification times refer to the number of times that the user carrying the user terminal modifies a viewed text. The viewed text may be a text obtained by the server by processing different audio. In an example, the viewed text includes a recognized text, a recognition update text, and a translation text. The user terminal identifier is used for indicating the user carrying the user terminal.

In an embodiment, the server determines, according to the received modified text and corresponding user terminal identifier, a quantity of modified texts belonging to the same user terminal identifier, and uses the quantity as the number of text modification times corresponding to the same user terminal identifier.

S704. The server detects text modification accuracy rates corresponding to the user terminal identifiers.

The text modification accuracy rate refers to a modification accuracy rate of modifying the corresponding text by the user terminal corresponding to the user terminal identifier within a preset time, that is, an accuracy rate of the modified text obtained within the preset time.

An error may occur in the modified text obtained by modifying the text. Therefore, in an embodiment, the server detects the modified text corresponding to the user terminal identifier, to determine whether the modified text is correct (e.g., after updating the SI model corresponding to the current session), and collects statistics on the accuracy rate, so as to obtain the text modification accuracy rate corresponding to the user terminal identifier.

S706. The server increases, for any user terminal identifier, a weight corresponding to the user terminal identifier in a case that the number of text modification times reaches a modification times threshold and the text modification accuracy rate reaches a text modification accuracy threshold.

The weight refers to a modification weight of modification made by each user terminal on the received text. User terminal identifiers at different levels may correspond to different weights. For example, a user terminal identifier at an ordinary user level corresponds to a relatively small weight. A user terminal identifier at an administrator permission user level corresponds to a relatively large weight.

In an embodiment, the server adjusts the weight corresponding to the user terminal identifier according to the number of text modification times and the text modification accuracy rate. The adjusting the weight corresponding to the user terminal identifier includes: lowering the weight corresponding to the user terminal identifier in a case that the number of text modification times is less than the modification times threshold and the text modification accuracy rate is less than the text modification accuracy threshold; and increasing the weight corresponding to the user terminal identifier in a case that the number of text modification times reaches the modification times threshold and the text modification accuracy rate reaches the text modification accuracy threshold.

In the data processing method based on simultaneous interpretation, when determining that the number of text modification times and the text modification accuracy rate meet a preset condition, the server increases the weight corresponding to the user terminal identifier, so that a larger weight is assigned to a user contributing more to the modified text, thereby helping improve the accuracy of the text.

In an embodiment, S210 may include: determining the weighted cumulative value of the modified text according to weights corresponding to the user terminal identifiers; and updating the simultaneous interpretation model according to the initial text and the modified text in a case that the weighted cumulative value reaches the threshold.

The weighted cumulative value is obtained by cumulating or accumulating the weights. The cumulating refers to adding up the weights. The accumulating means that, when a user terminal modifies the same text for a plurality of times, the number of modification times is multiplied by the corresponding weight, and then added with other weights.

For example, a user terminal A, a user terminal B and a user terminal C modify a certain text, and the weights corresponding to the user terminal identifiers are q1, q2 and q3 respectively. If the user terminal A modifies the text twice, and the user terminal B and the user terminal C modify the text once, a weighted cumulative value S=2× q1+q2+q3.

In an embodiment, when receiving the modified text transmitted by the user terminal, the server determines a level corresponding to the user terminal identifier of the user terminal, and obtains the corresponding weight according to the determined level. Then, the server performs cumulating or accumulating calculation on the obtained weights, and determines a calculation result as the weighted cumulative value of the modified text.

In an embodiment, when the server receives a plurality of modified texts transmitted by a certain user terminal, and the modified texts are obtained by modifying the same text, the server uses last received modified text as a final modified version of the user terminal.

In the data processing method based on simultaneous interpretation, statistics about the weighted cumulative value of the user terminal on the modified text are collected according to the fed back modified text, the simultaneous interpretation model is updated according to the initial text and the modified text in a case that the weighted cumulative value reaches the threshold, and subsequent audio is processed by using the updated simultaneous interpretation model, so that the accuracy of the text obtained by processing the audio can be improved. In addition, because the simultaneous interpretation model is updated in a case that the weighted cumulative value reaches the threshold, impact on the simultaneous interpretation model caused by invalid modification can be effectively avoided, thus further ensuring the accuracy of the text obtained by processing the audio.

Figure 8:
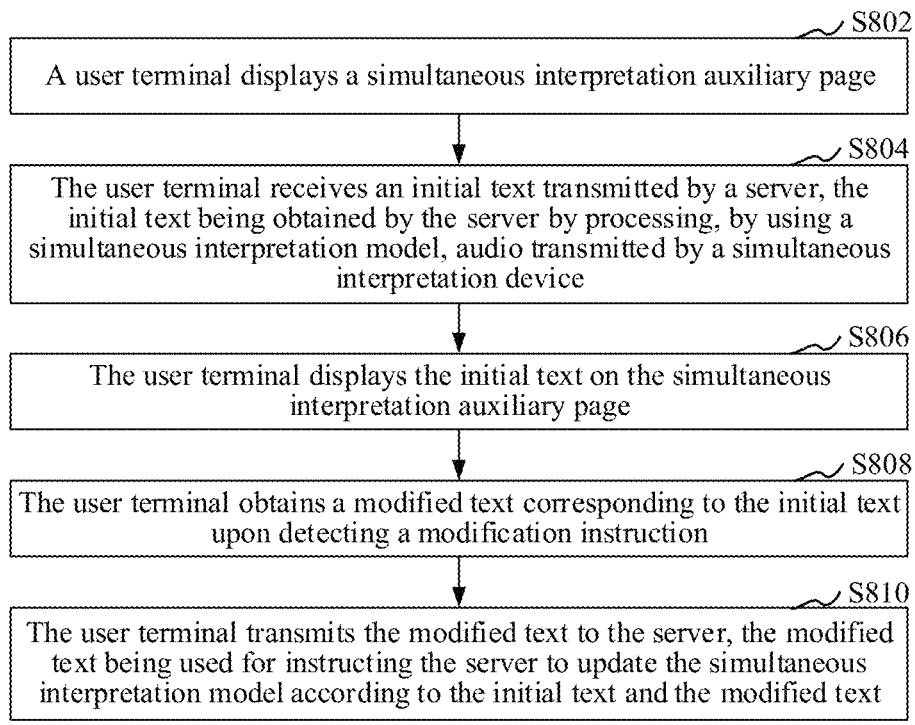
FIG. 8 is a schematic flowchart of a data processing method based on simultaneous interpretation in another embodiment.

As shown in FIG. 8, in an embodiment, a data processing method based on simultaneous interpretation is provided. Some embodiments are mainly described by using an example in which the method is applied to the user terminal 110 in FIG. 1. Referring to FIG. 8, the data processing method based on simultaneous interpretation includes the following steps:

S802. The user terminal displays a simultaneous interpretation auxiliary page.

The simultaneous interpretation auxiliary page may be used for displaying a text, or displaying a video embedded with a text. In addition, the simultaneous interpretation auxiliary page may alternatively be used for displaying a simultaneous interpretation list.

In an embodiment, the user terminal scans a bar code or a two-dimensional code in a simultaneous interpretation conference by using a social application, and enters an applet in the social application according to a link address in the bar code or the two-dimensional code. The user terminal displays the simultaneous interpretation auxiliary page in the applet, and displays the simultaneous interpretation list in the simultaneous interpretation auxiliary page. The simultaneous interpretation list includes simultaneous interpretation conferences with different conference numbers. A corresponding simultaneous interpretation conference in the simultaneous interpretation list is entered according to an inputted selection instruction.

In an embodiment, the step of displaying a simultaneous interpretation list in the simultaneous interpretation auxiliary page may include: transmitting, by the user terminal, an obtaining request carrying a phone number or a social account to the server, and receiving a simultaneous interpretation list allowed to be accessed transmitted by the server.

Figure 9:
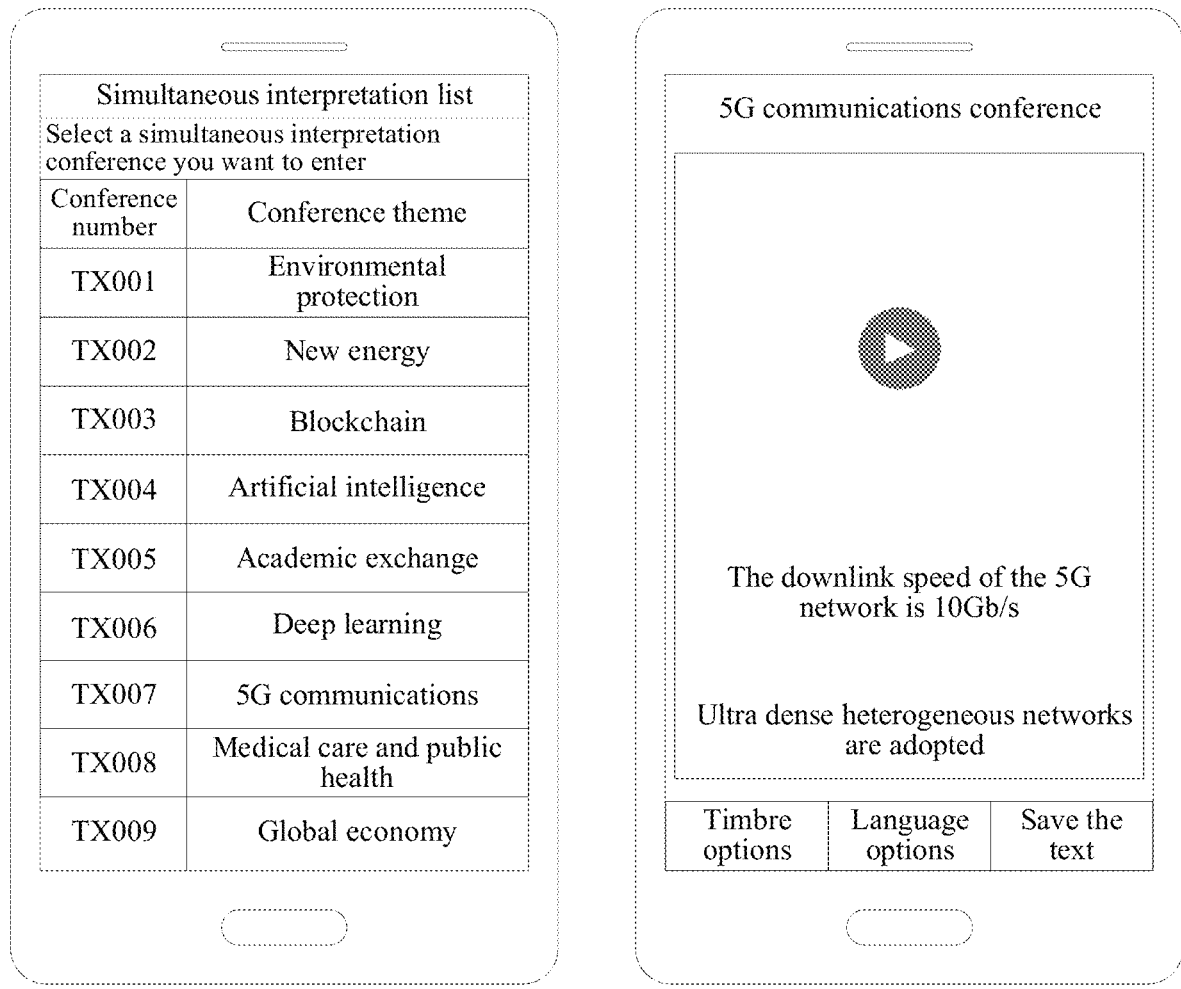
FIG. 9 is a schematic diagram of a simultaneous interpretation auxiliary page in an embodiment.

In an embodiment, FIG. 9 is a schematic diagram of entering and displaying a simultaneous interpretation auxiliary page. In FIG. 9, when the simultaneous interpretation auxiliary page is entered for the first time, the user terminal first displays the simultaneous interpretation list, and displays a corresponding simultaneous interpretation conference according to the selection instruction. If the simultaneous interpretation auxiliary page is not entered for the first time, the simultaneous interpretation conference is entered directly.

S804. The user terminal receives an initial text transmitted by a server, the initial text being obtained by the server by processing, by using a simultaneous interpretation model, audio transmitted by a simultaneous interpretation device.

S806. The user terminal displays the initial text in the simultaneous interpretation auxiliary page.

In an embodiment, when the text is displayed in the simultaneous interpretation auxiliary page, the user terminal synthesizes voice of a corresponding language according to the displayed text, and broadcasts the voice.

FIG. 9 also shows the text displayed in the simultaneous interpretation auxiliary page. In addition, the user terminal may switch between different languages to selectively display the text, and may further perform voice synthesis on the text by using different timbres (e.g., a male voice timbre, a female voice timbre, a celebrity voice timbre, etc.), and broadcast the voice.

S808. The user terminal obtains a modified text corresponding to the initial text upon detecting a modification instruction.

In an embodiment, the user terminal detects an inputted modification instruction for the initial text in real time, and obtains the modified text corresponding to the initial text according to the modification instruction. For example, the user may touch the initial text shown in the auxiliary page to trigger a modification. The initial text may be a translation unit (e.g., a phrase or a word). That is, user selection on any character of the translation unit may be considered as a modification instruction and trigger the modification of the initial text. The user terminal may further display an input box for the user to enter the modified text, and/or display candidate translation texts corresponding to the audio component of the initial text.

S810. The user terminal transmits the modified text to the server, the modified text being used for instructing the server to update the simultaneous interpretation model according to the initial text and the modified text.

In an example, the user terminal further transmits a local user terminal identifier to the server. Correspondingly, the modified text is used for instructing the server to determine a weighted cumulative value of the modified text according to a weight corresponding to the user terminal identifier. The simultaneous interpretation model is updated according to the initial text and the modified text in a case that the weighted cumulative value reaches a threshold.

In the foregoing data processing method based on simultaneous interpretation, the user terminal displays, by using the simultaneous interpretation auxiliary page, the text obtained by the server by processing the audio, and the user terminal obtains the corresponding modified text upon detecting the modification instruction, so that when an error occurs in the text obtained by processing the audio, the user terminal may make a corresponding modification. In addition, the user terminal further synchronizes the obtained modified text to the server, to instruct the server to update the simultaneous interpretation model according to the text obtained by processing the audio and the modified text in a case that the weighted cumulative value of the modified text reaches the threshold, thereby improving the accuracy of the text.

Figure 10:
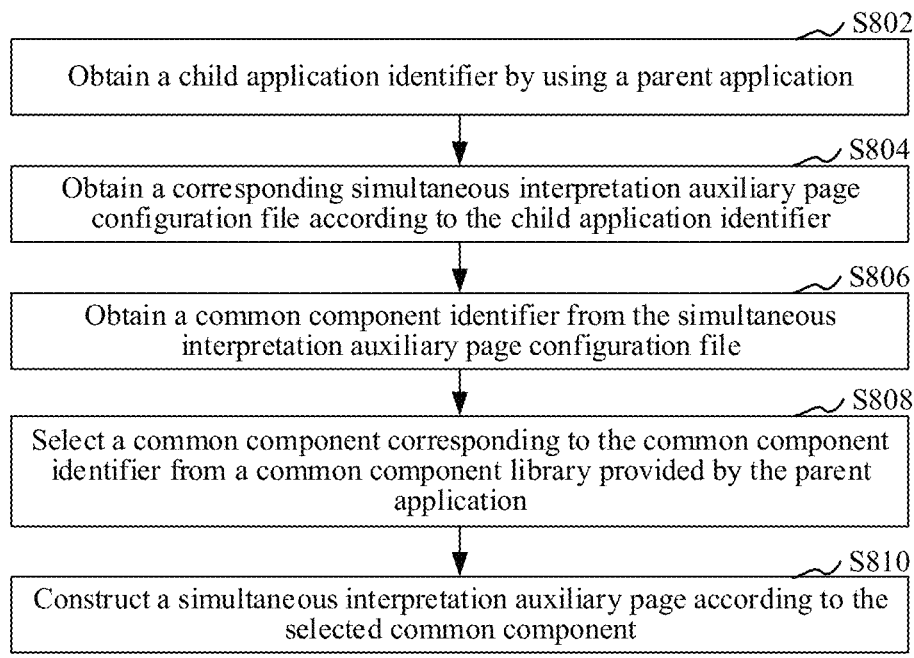
FIG. 10 is a schematic flowchart of steps of building a simultaneous interpretation auxiliary page in an embodiment.

In an embodiment, as shown in FIG. 10, the displaying a simultaneous interpretation auxiliary page includes the following steps:

S1002. The user terminal obtains a child application identifier by using a parent application.

The parent application is an application that carries the child application, and provides an environment for implementing the child application. The parent application is a native application, and may be directly run on an operating system. The parent application may include a social application or a live application. The child application is an application that may be implemented in the environment provided by the parent application. In an example, the child application may be a simultaneous interpretation applet.

In an embodiment, the user terminal may display a child application list by using the parent application, receive a selection instruction for options in the child application list, and determine an option selected in the child application list according to the selection instruction, to obtain a child application identifier corresponding to the selected option.

S1004: The user terminal obtains a corresponding simultaneous interpretation auxiliary page configuration file according to the child application identifier.

The user terminal may obtain the simultaneous interpretation auxiliary page configuration file corresponding to the child application identifier locally or from the server by using the parent application. Further, the user terminal may determine a corresponding folder locally or on the server according to the child application identifier, to obtain the simultaneous interpretation auxiliary page configuration file from the folder. Alternatively, the user terminal may obtain, according to a correspondence between the child application identifier and a page identifier, the simultaneous interpretation auxiliary page configuration file corresponding to the child application identifier.

The page identifier is used for uniquely identifying one simultaneous interpretation auxiliary page included in one child application, and different child applications may use a same page identifier.

The simultaneous interpretation auxiliary page configuration file is a file for configuring a page presented by the child application. The configuration file may be source code or a file obtained after source code is complied. The page presented by the child application is referred to as a simultaneous interpretation auxiliary page, and the child application may include one or more simultaneous interpretation auxiliary pages.

S1006: The user terminal obtains a common component identifier from the simultaneous interpretation auxiliary page configuration file.

The terminal may parse the simultaneous interpretation auxiliary page configuration file, to obtain the common component identifier from the simultaneous interpretation auxiliary page configuration file.

The common component identifier is used for uniquely identifying a corresponding common component. The common component is component provided by the parent application. The component may be shared by different child applications. The common component has a visual form, and is a composition unit of the simultaneous interpretation auxiliary page. The common component may be further encapsulated with logic code. The logic code is used for processing a trigger event for the common component. That different child applications share the common component may specifically means that the same common component is invoked at the same time or at different moments. In an embodiment, the common component may be shared by the parent application and the child application.

S1008: The user terminal selects a common component corresponding to the common component identifier in a common component library provided by the parent application.

The common component library is a set of common components provided by the parent application. Each common component in the common component library has a unique common component identifier. The common component library may be downloaded by the parent application from the server to a local location during running, or may be obtained by the parent application from a corresponding application installation package through uncompressing when the parent application is installed.

S1010. The user terminal constructs the simultaneous interpretation auxiliary page according to the selected common component.

The user terminal may obtain default component style data carried by the selected common component, to organize and render the selected common component according to the default component style data, so as to form the simultaneous interpretation auxiliary page.

The default component style data is data for describing a default presentation form of the common component. The default component style data may include attributes such as a default location, size, color, font, and font size of the common component on the simultaneous interpretation auxiliary page. The user terminal may construct the simultaneous interpretation auxiliary page by using browser controls integrated in the parent application and according to the selected common component.

According to the foregoing data processing method based on simultaneous interpretation, the parent application runs in the user terminal, and the parent application provides the common component library. The child application identifier may be obtained by using the parent application, and the corresponding simultaneous interpretation auxiliary page configuration file is obtained, so that the common component is selected from the common component library according to the simultaneous interpretation auxiliary page configuration file, to construct the simultaneous interpretation auxiliary page. The child application identifiers may identify different child applications, and the parent application may implement different child applications according to simultaneous interpretation auxiliary page configuration files corresponding to different child application identifiers. When the parent application runs, the common component provided by the parent application may be used for quickly constructing the simultaneous interpretation auxiliary page, so that the installation time of the application is reduced, and use efficiency of the application is improved.

Figure 11:
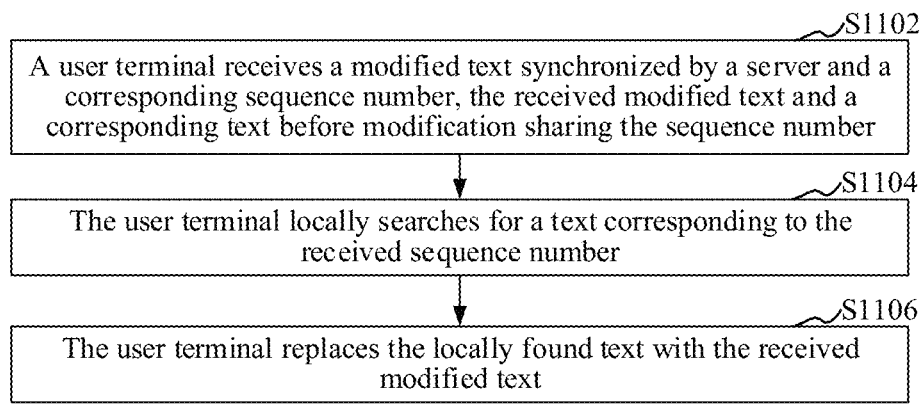
FIG. 11 is a schematic flowchart of steps of updating a locally stored text in an embodiment.

In an embodiment, as shown in FIG. 11, the method further includes the following steps:

S1102. The user terminal receives a modified text synchronized by the server and a corresponding sequence number, the received modified text and a corresponding text before modification sharing the sequence number.

The sequence number is used for indicating an arrangement position of a certain text in a document, or a storage position of a certain text in a certain storage area. The document refers to a text file used for saving and editing the text, including a TEXT document, a WORD document, an XML document, or the like.

In an embodiment, when it is determined that the weighted cumulative value reaches the threshold, the server synchronizes the modified text and the corresponding sequence number to the user terminal. After receiving the modified text and the corresponding sequence number, the user terminal performs S1104.

S1104. The user terminal locally searches for a text corresponding to the received sequence number.

In an embodiment, the user terminal searches the storage area for the text corresponding to the received sequence number. Alternatively, because the text may be saved in the document, and the document has a mapping relationship with the conference number and is stored in the user terminal, the user terminal may alternatively search for, according to the conference number, the document saving the text, and search the document for the corresponding text according to the received sequence number.

S1106. The user terminal replaces the locally found text with the received modified text.

According to the data processing method based on simultaneous interpretation, the user terminal searches for the corresponding text according to the received sequence number, and replaces the found text with the received modified text, so as to ensure that when an error occurs in a certain text, each user terminal can make a modification synchronously, thereby improving the accuracy of the obtained text.

Figure 12:
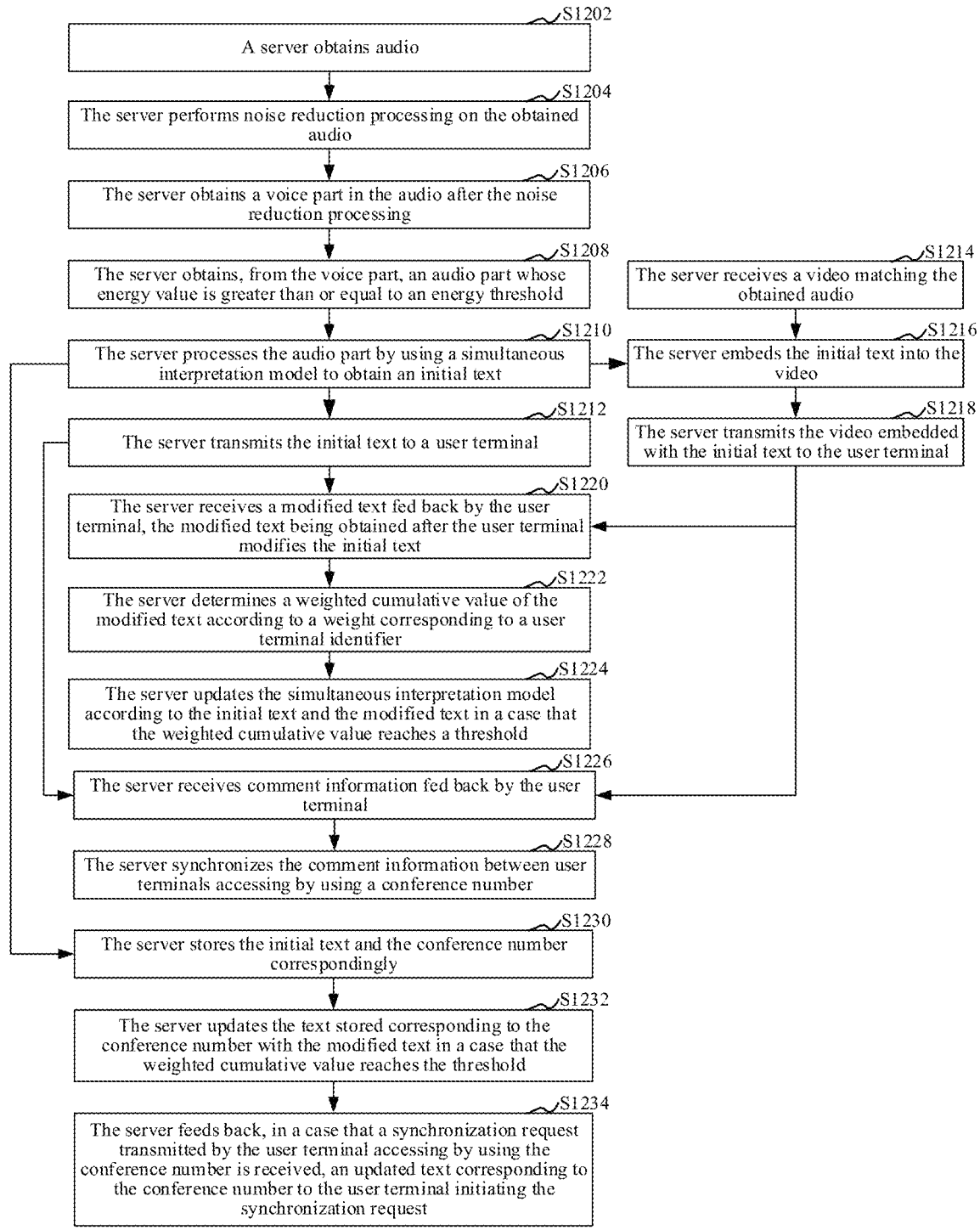
FIG. 12 is a schematic flowchart of a data processing method based on simultaneous interpretation in another embodiment.

As shown in FIG. 12, in an embodiment, a data processing method based on simultaneous interpretation is provided. Some embodiments are described by using an example in which the method is applied to the server 120 in FIG. 1. Referring to FIG. 12, the data processing method based on simultaneous interpretation includes the following steps:

S1202. The server obtains audio.

S1204. The server performs noise reduction processing on the obtained audio.

S1206. The server obtains a voice component in the audio after the noise reduction processing.

S1208. The server obtains, from the voice component, an audio component whose energy value is greater than or equal to an energy threshold.

S1210. The server processes the audio component by using a simultaneous interpretation model to obtain an initial text.

S1212. The server transmits the initial text to a user terminal.

S1214. The server receives a video matching the obtained audio.

S1216. The server embeds the initial text into the video.

S1218. The server transmits the video embedded with the initial text to the user terminal.

In an embodiment, the server may alternatively transmit the initial text to the user terminal accessing by using the conference number.

S1220. The server receives a modified text fed back by the user terminal, the modified text being obtained after the user terminal modifies the initial text.

S1222. The server determines a weighted cumulative value of the modified text according to a weight corresponding to a user terminal identifier.

S1224. The server updates the simultaneous interpretation model according to the initial text and the modified text in a case that the weighted cumulative value reaches a threshold.

S1226. The server receives comment information fed back by the user terminal.

S1228. The server synchronizes the comment information between user terminals accessing by using a conference number.

S1230. The server stores the initial text and the conference number correspondingly.

S1232. The server updates, in a case that the weighted cumulative value reaches the threshold, the text stored corresponding to the conference number with the modified text.

S1234. The server feeds back, in a case that a synchronization request transmitted by the user terminal accessing by using the conference number is received, an updated text corresponding to the conference number to the user terminal initiating the synchronization request.

Figure 13:
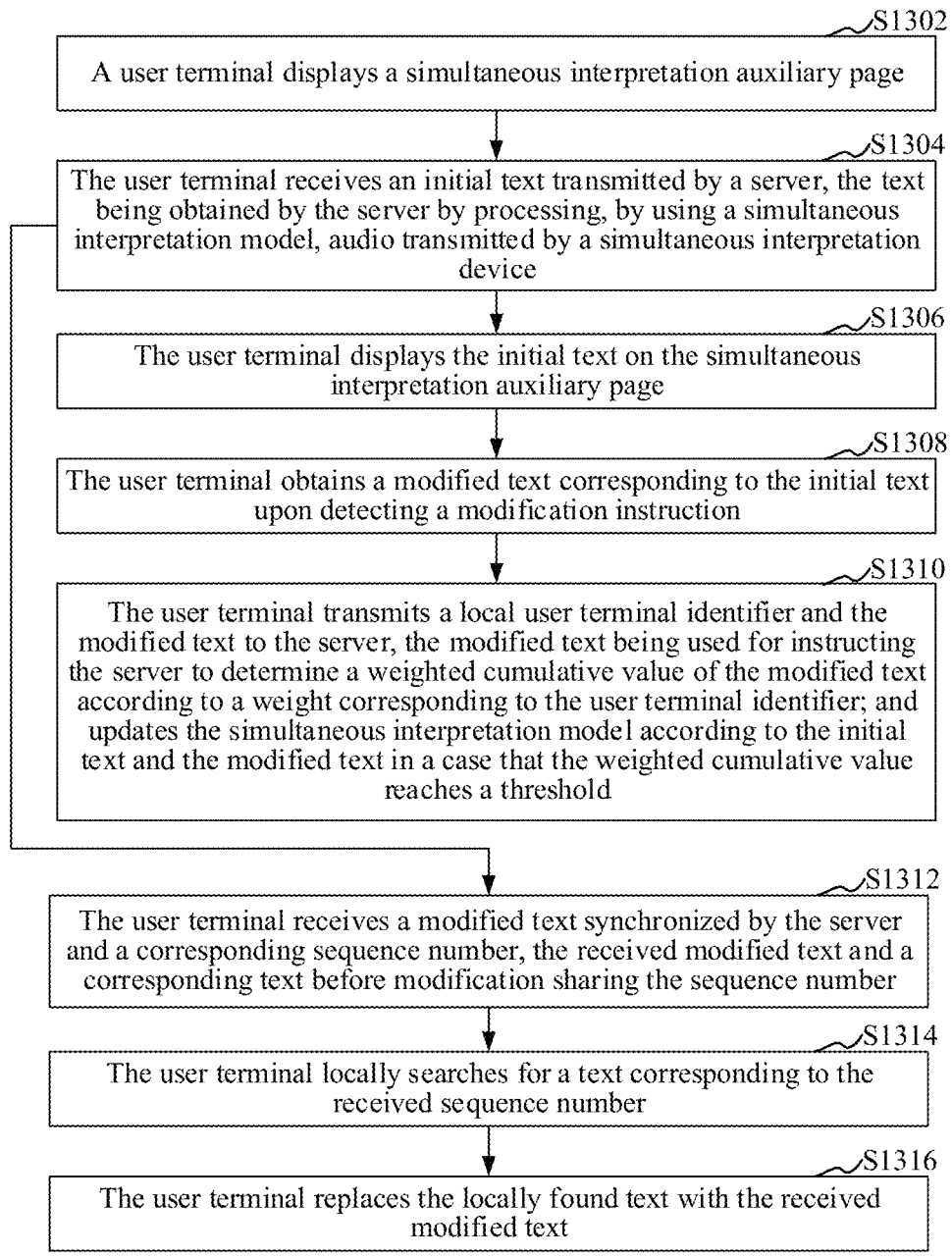
FIG. 13 is a schematic flowchart of a data processing method based on simultaneous interpretation in still another embodiment.

As shown in FIG. 13, in an embodiment, another data processing method based on simultaneous interpretation is provided. Some embodiments are mainly described by using an example in which the method is applied to the user terminal 110 in FIG. 1. Referring to FIG. 13, the data processing method based on simultaneous interpretation includes the following steps:

S1302. The user terminal displays a simultaneous interpretation auxiliary page.

S1304. The user terminal receives an initial text transmitted by a server, the text being obtained by the server by processing, by using a simultaneous interpretation model, audio transmitted by a simultaneous interpretation device.

S1306. The user terminal displays the initial text in the simultaneous interpretation auxiliary page.

S1308. The user terminal obtains a modified text corresponding to the initial text upon detecting a modification instruction.

S1310. The user terminal transmits a local user terminal identifier and the modified text to the server, the modified text being used for instructing the server to determine a weighted cumulative value of the modified text according to a weight corresponding to the user terminal identifier; and updates the simultaneous interpretation model according to the initial text and the modified text in a case that the weighted cumulative value reaches the threshold.

S1312. The user terminal receives a modified text synchronized by the server and a corresponding sequence number, the received modified text and a corresponding text before modification sharing the sequence number.

S1314. The user terminal locally searches for a text corresponding to the received sequence number.

S1316. The user terminal replaces the locally found text with the received modified text.

Figure 14:
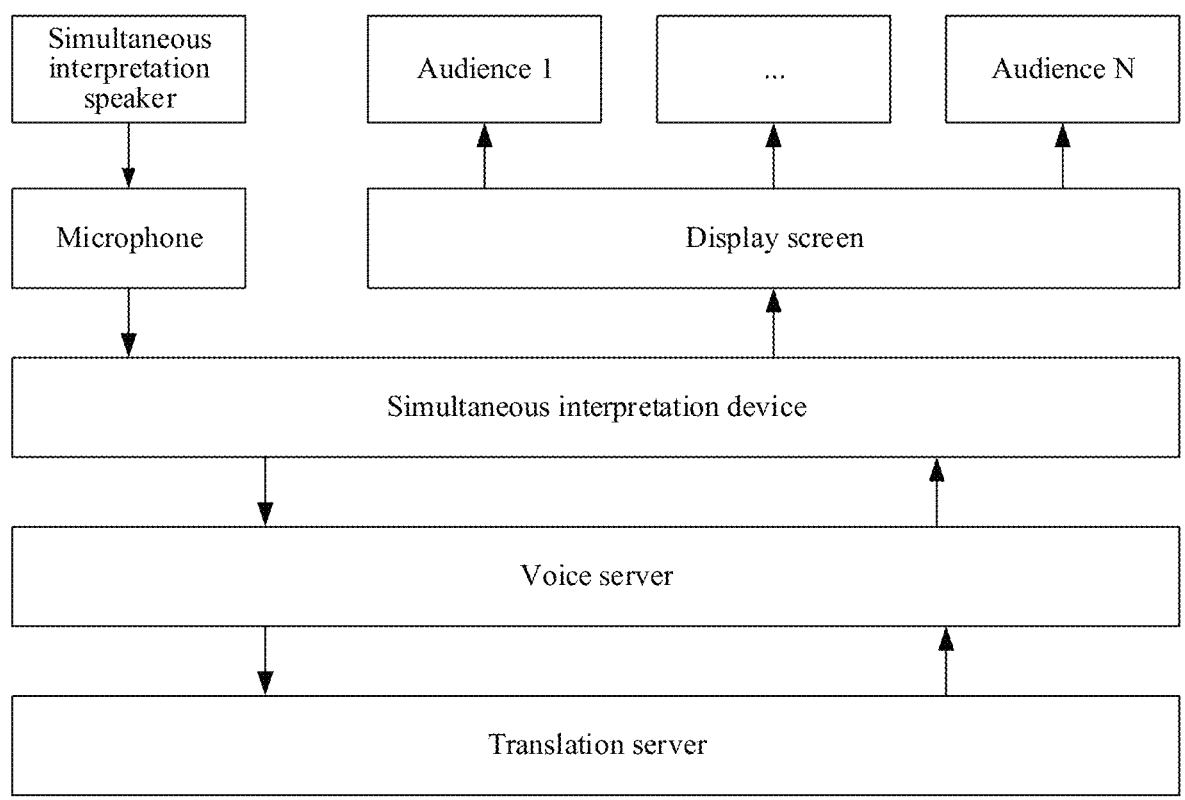
FIG. 14 is a schematic structural diagram of a conventional simultaneous interpretation system in an embodiment.

In the simultaneous interpretation solution in the related art, a simultaneous interpretation device acquires audio and performs corresponding processing, and then uploads the processed audio to a voice server for speech recognition. The voice server transmits a recognized text to a translation server after the recognition is finished. The translation server translates the recognized text into a target language, and returns the translation text to a simultaneous interpretation client. Finally, the simultaneous interpretation device displays the returned result on a display screen. A typical conference simultaneous interpretation system is shown in FIG. 14.

In the simultaneous interpretation system in the related art, a text is mainly displayed in the following two manners. The first manner is split-screen display. A speaker's image or PPT occupies a portion of the screen, and a simultaneous interpretation text occupies another portion of the screen. The second manner is caption presentation. The speaker's image or PPT occupies the whole screen, and the simultaneous interpretation text is displayed in the form of captions at the bottom of the screen.

However, there are the following problems in the foregoing two display manners: 1) It is difficult to see clearly. For a conference with a large quantity of participants, audiences in back rows and audiences with poor viewing angles do not see the text displayed on the conference display screen clearly. In addition, audiences who are unable to participate in the conference cannot obtain the conference content. 2) There is no interaction, the audiences can only passively obtain the simultaneous interpretation text. 3) The simultaneous interpretation model cannot be optimized. The audiences cannot modify the recognized text and/or the translation text instantly, and the voice model and the translation model in the simultaneous interpretation cannot be optimized.

Figure 15:
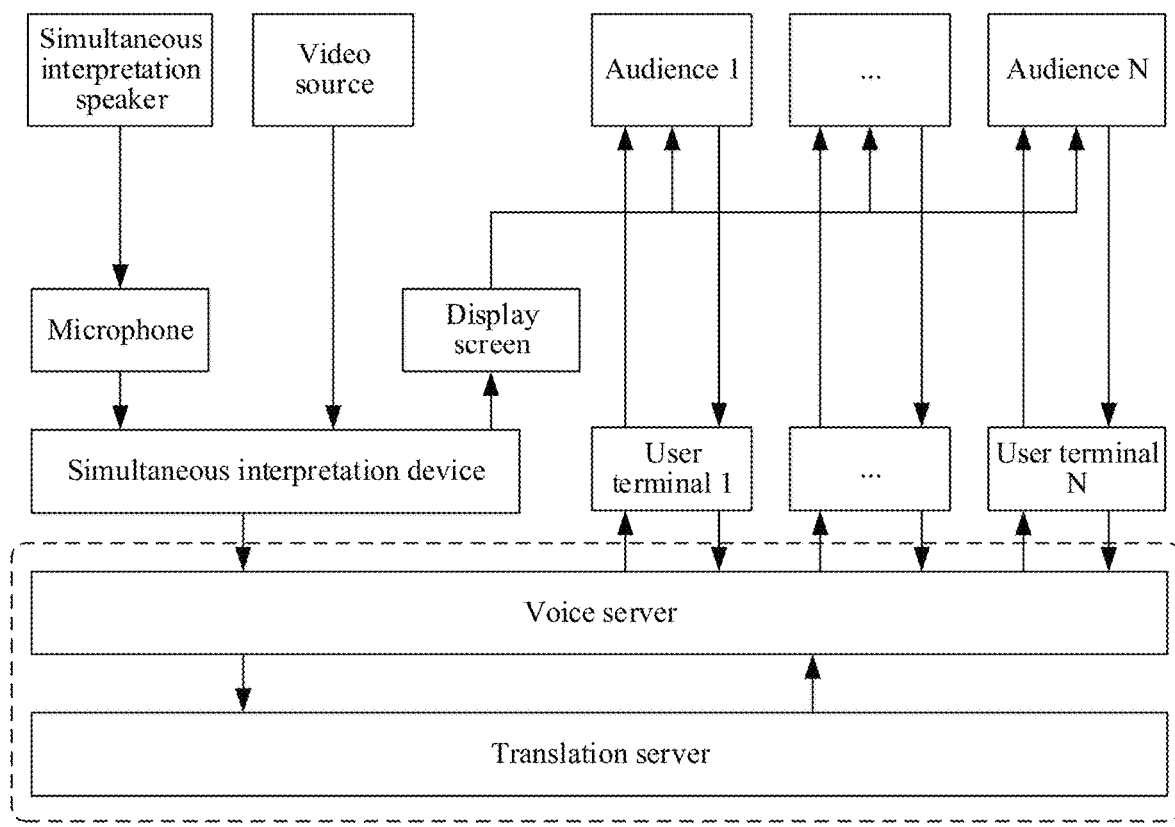
FIG. 15 is a schematic structural diagram of a simultaneous interpretation system to which a data processing method based on simultaneous interpretation is applied in an embodiment.

For the foregoing problems, a solution is provided in some embodiments of the present disclosure. The simultaneous interpretation system in some embodiments of the present disclosure is shown in FIG. 15. As shown in FIG. 15, the simultaneous interpretation system includes a server, a simultaneous interpretation device, a microphone, a user terminal, and a display screen. The server may include a cluster of servers, for example, a voice server and a translation server.

Figure 16:
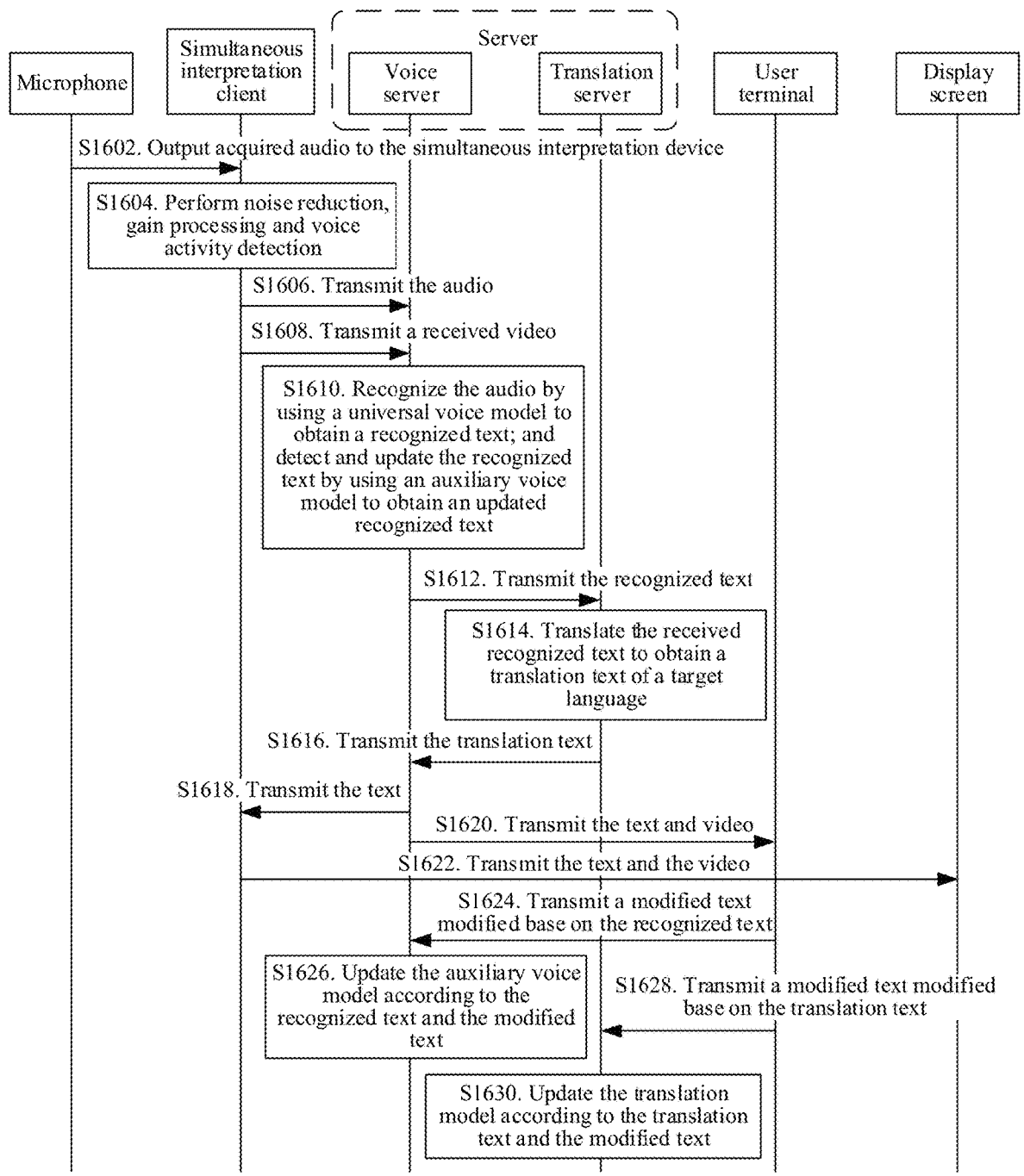
FIG. 16 is a sequence diagram of a data processing method based on simultaneous interpretation in an embodiment.

As shown in FIG. 16, in an embodiment, still another data processing method based on simultaneous interpretation is provided. Referring to FIG. 16, the data processing method based on simultaneous interpretation includes the following steps:

S1602. A microphone outputs acquired audio to a simultaneous interpretation device.

S1604. The simultaneous interpretation device performs noise reduction processing, gain processing and voice activity detection processing on the received audio.

The simultaneous interpretation device performs, by using a front-end processing algorithm, the noise reduction processing, the gain processing and the voice activity detection processing on the audio acquired by the microphone. In an example, the front-end processing algorithm may adopt a "deep neural network (DNN)+energy" dual detection manner. The DNN may be used for suppressing noise. The energy detection may be used for filtering out a portion of the audio in which the energy is less than a threshold.

S1606. The simultaneous interpretation device transmits the audio to a voice server.

S1608. The simultaneous interpretation device transmits a received video to the voice server.

In some embodiments of the present disclosure, in addition to voice, the video is also obtained as an input source. The video may be a speaker's PPT, or may be a video of the speaker.

A simultaneous interpretation client uniquely identifies a current simultaneous interpretation conference and corresponding speech content (including a recognized text and a translation text) by uploading fields such as "conference number".

S1610. The voice server recognizes the audio by using a universal voice model to obtain a recognized text, and detects and updates the recognized text by using an auxiliary voice model to obtain an updated recognized text.

S1612. The voice server transmits the recognized text to a translation server.

S1614. The translation server translates the received recognized text to obtain a translation text of a target language.

S1616. The translation server transmits the translation text to the voice server.

S1618. The voice server combines the recognized text and the translation text, and transmits the combined text to the simultaneous interpretation device.

S1620. The voice server combines the recognized text, the translation text and the video, and transmits the combined text and video to a user terminal.

The voice server pushes the combined text and video to all activated user terminals.

S1622. The simultaneous interpretation device transmits the combined text and video to a display screen for display.

Herein, the simultaneous interpretation device transmits the recognized text, the translation text and the video to the display screen of the simultaneous interpretation conference for display.

S1624. The user terminal modifies the recognized text, and transmits the obtained modified text to the voice server.

In the simultaneous interpretation process, the user may scan a two-dimensional code by using a social application or click a corresponding link to enter a webpage or an applet. The user terminal selects, by using a phone number or a Wechat number, a simultaneous interpretation list allowed to be accessed. The user clicks a certain entry to enter the simultaneous interpretation auxiliary page. After entering the simultaneous interpretation auxiliary page, the user terminal is activated. The simultaneous interpretation auxiliary page of the user terminal displays a current speech text by default. The user terminal may further automatically switch between different languages to display the text, synthesize voice with different corresponding timbres according to the displayed text, and broadcast the voice.

In an example, a function key for one-click saving is disposed in the simultaneous interpretation auxiliary page. When the function key is triggered, the user terminal saves the received recognized text and the translation text to form a simultaneous interpretation full text. In addition, the user may modify the recognized text and the translation text in the user terminal, and the modified text may be uploaded to the server.

S1626. The voice server updates the auxiliary voice model according to the recognized text and the modified text.

S1628. The user terminal modifies the translation text, and transmits the obtained modified text to the translation server by using the voice server.

S1630. The translation server updates the translation model according to the translation text and the modified text.

When the voice server or the translation server receives the modified text, the voice model and the translation model are updated based on a corresponding algorithm by using the modified text in real time, and the updated voice model and translation model are used in a subsequent speech of current simultaneous interpretation. In terms of updating the voice model in real time, the voice model includes a universal voice model and an auxiliary voice model. Loading of the universal voice model is completed when the program starts running. After a modification instruction from the user is received, the auxiliary voice model is updated and hot-reloaded, thereby implementing seamless switching in the whole process. The auxiliary voice model may be hot-loaded for a plurality of times during program running. After the auxiliary voice model is update each time, the auxiliary voice model is hot-loaded once.

The hot-loading refers to reloading class (a development environment) during running. Based on changes of byte-code, no memory is released, development is available, online is unavailable, tomcat is not restarted for the hot-loading, and repackaging is not performed.

In a decoding process of an acoustic symbol sequence of the audio, the server inputs the acoustic symbol sequence of the audio to the universal voice model for speech recognition to obtain the recognized text. The recognized text is then inputted to the auxiliary voice model, and the text in which an error occurs previously is replaced with the modified text by using the auxiliary voice model.

The server performs reasonableness detection on the modified text, the modified text detected to be reasonable being used for updating the voice model and/or the translation model. For example, if a translation error is found, and a plurality of people correct the translation error, the server determines a weighted cumulative value of the modified text according to weights of users carrying the user terminals. When the weighted cumulative value reaches the threshold, the server optimizes the translation model.

The server determines a contribution degree of user modification according to the number of text modification times and a text modification accuracy rate, and adaptively adjusts the corresponding weight.

The audiences make comments on the speaker or the speech content by using the user terminal. The user terminal transmits the comment information to the server, and the comment information is transferred to the conference display screen and the activated user terminals through the server, the comment information being displayed on the display screen and the user terminals in the form of barrages.

The data processing method based on simultaneous interpretation may achieve the following beneficial effects:
1) The text after the speech recognition and the text after translation may be viewed through the user terminal, thereby avoiding the problem that audiences in back rows and audiences with poor viewing angles cannot see the text clearly.
2) An interactive effect is implemented. The audiences enter the simultaneous interpretation auxiliary page through the user terminals and may make and submit comments on the speaker or speech content. The submitted comments are issued to the conference display screen and the user terminals by the server.
3) The simultaneous interpretation model (including the voice model and the translation model) may be updated in real time. The recognized text and/or the translation text may be modified through the user terminal. If a large quantity of users simultaneously modify a certain text or a certain word or a person having the administrator permission modifies a certain text or a certain word, the server updates the voice model and/or the translation model, and the updated voice model and the translation model are used for subsequent speech recognition and translation, thereby preventing the error from occurring again.
4) The target language may be switched at any time. In an applet of a social application, the user may set a translation language and select a personalized timbre to synthesize a corresponding voice.
5) Simultaneous interpretation full-text content may be conveniently obtained. The simultaneous interpretation auxiliary page is provided with a function of saving conference speech records with one click.

FIG. 2 and FIG. 8 are schematic flowcharts of a data processing method based on simultaneous interpretation in an embodiment. Although steps of the flowcharts in FIG. 2 and FIG. 8 are displayed sequentially according to arrows, the steps are not necessarily performed in a sequence indicated by the arrows. Unless clearly specified in this specification, there is no strict sequence limitation on the execution of the steps, and the steps may be performed in another sequence. Moreover, at least some steps in FIG. 2 and FIG. 8 may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

Figure 17:
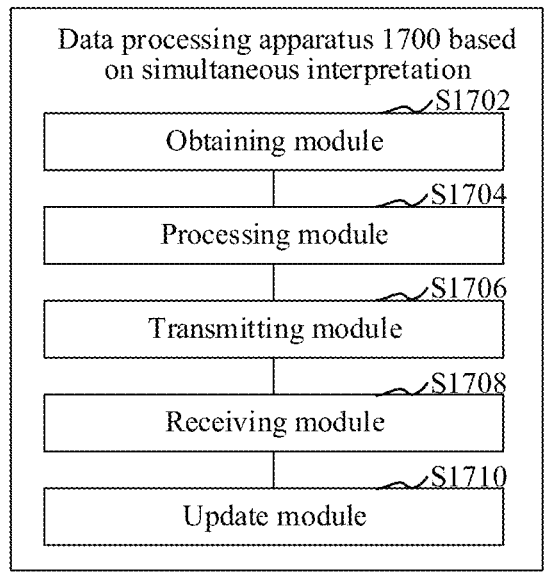
FIG. 17 is a structural block diagram of a data processing apparatus based on simultaneous interpretation in an embodiment.

As shown in FIG. 17, in an embodiment, a data processing apparatus based on simultaneous interpretation is provided. The data processing apparatus 1700 based on simultaneous interpretation includes: an obtaining module 1702, a processing module 1704, a transmitting module 1706, a receiving module 1708, a determining module 1712, and an update module 1710.

The obtaining unit 1702 is configured to obtain audio transmitted by a simultaneous interpretation device.

The processing module 1704 is configured to process the audio by using a simultaneous interpretation model to obtain an initial text.

The transmitting module 1706 is configured to transmit the initial text to a user terminal.

The receiving module 1708 is configured to receive a modified text fed back by the user terminal, the modified text being obtained after the user terminal modifies the initial text.

The update module 1710 is configured to update the simultaneous interpretation model according to the initial text and the modified text.

According to the foregoing data processing apparatus based on simultaneous interpretation, the modified text that is obtained by modifying the initial text and that is fed back by the user terminal is received, so that corresponding feedback can be obtained in time when the initial text is modified. In addition, the simultaneous interpretation model is updated according to the initial text and the modified text, and then subsequent audio is processed by using the updated simultaneous interpretation model, so that the accuracy of the text obtained by processing the audio is improved.

Figure 18:
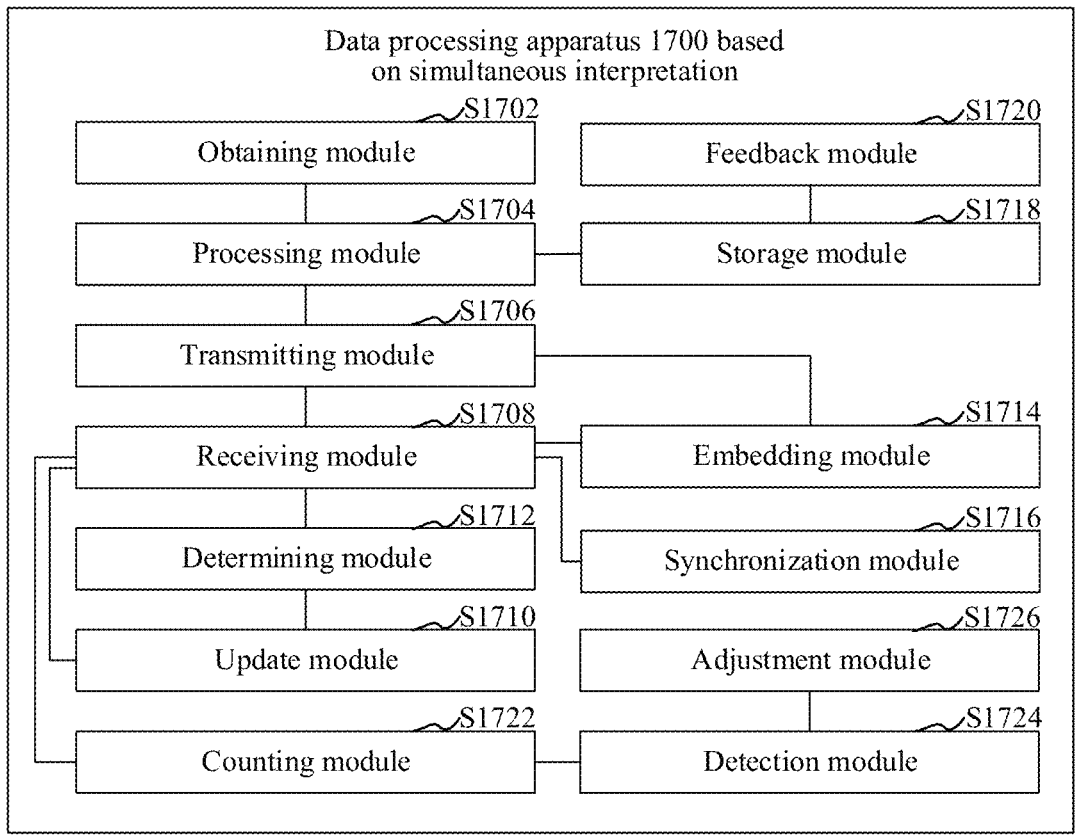
FIG. 18 is a structural block diagram of a data processing apparatus based on simultaneous interpretation in another embodiment.

In an embodiment, as shown in FIG. 18, the apparatus may further include a determining module 1712.

The determining module 1712 is configured to determine a weighted cumulative value of the modified text according to weights corresponding to user terminal identifiers.

The update module 1710 is further configured to update the simultaneous interpretation model according to the initial text and the modified text in a case that the weighted cumulative value reaches a threshold.

In an embodiment, the processing module 1704 is further configured to: perform noise reduction processing on the audio; obtain a voice component included in the audio after the noise reduction processing; obtain, from the voice component, an audio component whose energy value is greater than or equal to an energy threshold; and process the audio component by using the simultaneous interpretation model to obtain the initial text.

In an embodiment, the simultaneous interpretation model includes a universal voice model and an auxiliary voice model.

The processing module 1704 is further configured to: perform speech recognition on the audio by using the universal voice model to obtain a recognized text; and update the recognized text by using the auxiliary voice model to obtain a recognition update text, the initial text including at least one of the recognized text and the recognition update text.

The update module 1710 is further configured to update the auxiliary voice model according to the initial text and the modified text.

In an embodiment, the simultaneous interpretation model includes a translation model. The initial text includes a translation text. The modified text includes a modified translation text.

The update module 1710 is further configured to update the translation model according to the translation text and the modified translation text.

In an embodiment, as shown in FIG. 18, the apparatus further includes: an embedding module 1714.

The receiving module 1708 is further configured to receive a video that is transmitted by the simultaneous interpretation device and that matches the audio.

The embedding module 1714 is configured to embed the initial text into the video.

The transmitting module 1706 is further configured to transmit the video embedded with the initial text to the user terminal.

In an embodiment, the apparatus further includes a synchronization module 1716.

The audio corresponds to a group identifier.

The transmitting module 1706 is further configured to transmit the initial text to the user terminal accessing by using the group identifier.

The receiving module 1708 is further configured to receive comment information fed back by the user terminal.

The synchronization module 1716 is configured to synchronize the comment information among the user terminals accessing by using the group identifier.

In an embodiment, as shown in FIG. 18, the apparatus further includes a storage module 1718 and a feedback module 1720. The audio corresponds to the group identifier.

The transmitting module 1706 is further configured to transmit the initial text to the user terminal accessing by using the group identifier.

The storage module 1718 is configured to store the initial text and the group identifier correspondingly.

The update module 1710 is further configured to update, in a case that a weighted cumulative value of the modified text reaches a threshold, the text stored corresponding to the group identifier with the modified text.

The feedback module 1720 is configured to feedback, in a case that a synchronization request transmitted by the user terminal accessing by using the group identifier is received, an updated text corresponding to the group identifier to the user terminal initiating the synchronization request.

In an embodiment, as shown in FIG. 18, the apparatus further includes: a counting module 1722, a detection module 1724, and an adjustment module 1726.

The counting module 1722 is configured to count the numbers of text modification times corresponding to user terminal identifiers.

The detection module 1724 is configured to detect text modification accuracy rates corresponding to the user terminal identifiers.

The adjustment module 1726 is configured to increase, for any user terminal identifier, a weight corresponding to the user terminal identifier in a case that the number of text modification times reaches a modification times threshold and the text modification accuracy rate reaches a text modification accuracy threshold.

All the foregoing optional technical solutions may be randomly combined to form optional embodiments of the present disclosure.

Figure 19:
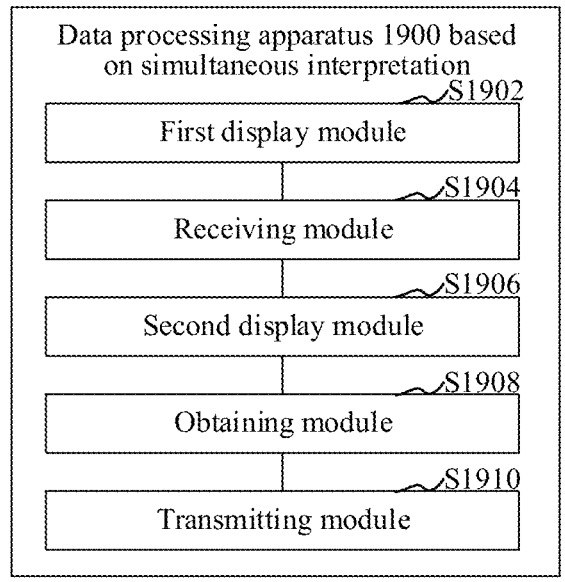
FIG. 19 is a structural block diagram of a data processing apparatus based on simultaneous interpretation in another embodiment.

As shown in FIG. 19, in an embodiment, a data processing apparatus based on simultaneous interpretation is provided. The data processing apparatus 1900 based on simultaneous interpretation includes: a first display module 1902, a receiving module 1904, a second display module 1906, an obtaining unit 1908, and a transmitting module 1910.

The first display module 1902 is configured to display a simultaneous interpretation auxiliary page.

The receiving module 1904 is configured to receive an initial text transmitted by a server, the initial text being obtained by the server by processing, by using a simultaneous interpretation model, audio transmitted by a simultaneous interpretation device.

The second display module 1906 is configured to display the initial text in the simultaneous interpretation auxiliary page.

The obtaining unit 1908 is configured to obtain a modified text corresponding to the initial text upon detecting a modification instruction.

The transmitting module 1910 is configured to transmit the modified text to the server, the modified text being used for instructing the server to update the simultaneous interpretation model according to the initial text and the modified text.

According to the foregoing data processing apparatus based on simultaneous interpretation, the initial text obtained by the server by processing the audio is displayed in the simultaneous interpretation auxiliary page, and the corresponding modified text is obtained upon detecting the modification instruction, so that when an error occurs in the text obtained by the server by processing the audio, the user terminal may make a corresponding modification, and synchronize the obtained modified text to the server, to instruct the server to update the simultaneous interpretation model according to the initial text and the modified text, thus improving the accuracy of the text obtained by processing the audio.

In an embodiment, the simultaneous interpretation auxiliary page is displayed. The first display module 1902 is further configured to: obtain a child application identifier by using a parent application; obtain a corresponding simultaneous interpretation auxiliary page configuration file according to the child application identifier; obtain a common component identifier from the simultaneous interpretation auxiliary page configuration file; select a common component corresponding to the common component identifier in a common component library provided by the parent application; and construct the simultaneous interpretation auxiliary page according to the selected common component.

Figure 20:
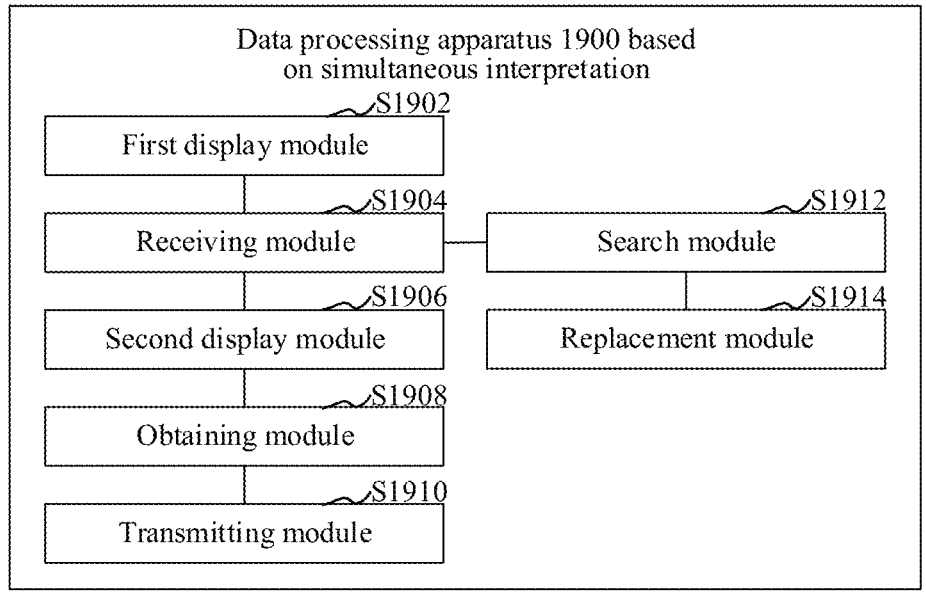
FIG. 20 is a structural block diagram of a data processing apparatus based on simultaneous interpretation in another embodiment.

In an embodiment, as shown in FIG. 20, the apparatus further includes a search module 1912 and a replacement module 1914.

The receiving module 1904 is further configured to receive a modified text synchronized by the server and a corresponding sequence number, the received modified text and a corresponding text before modification sharing the sequence number.

The search module 1912 is configured to locally search for a text corresponding to the sequence number.

The replacement module 1914 is configured to replace the locally found text with the received modified text.

All the foregoing optional technical solutions may be randomly combined to form optional embodiments of the present disclosure.

Figure 21:
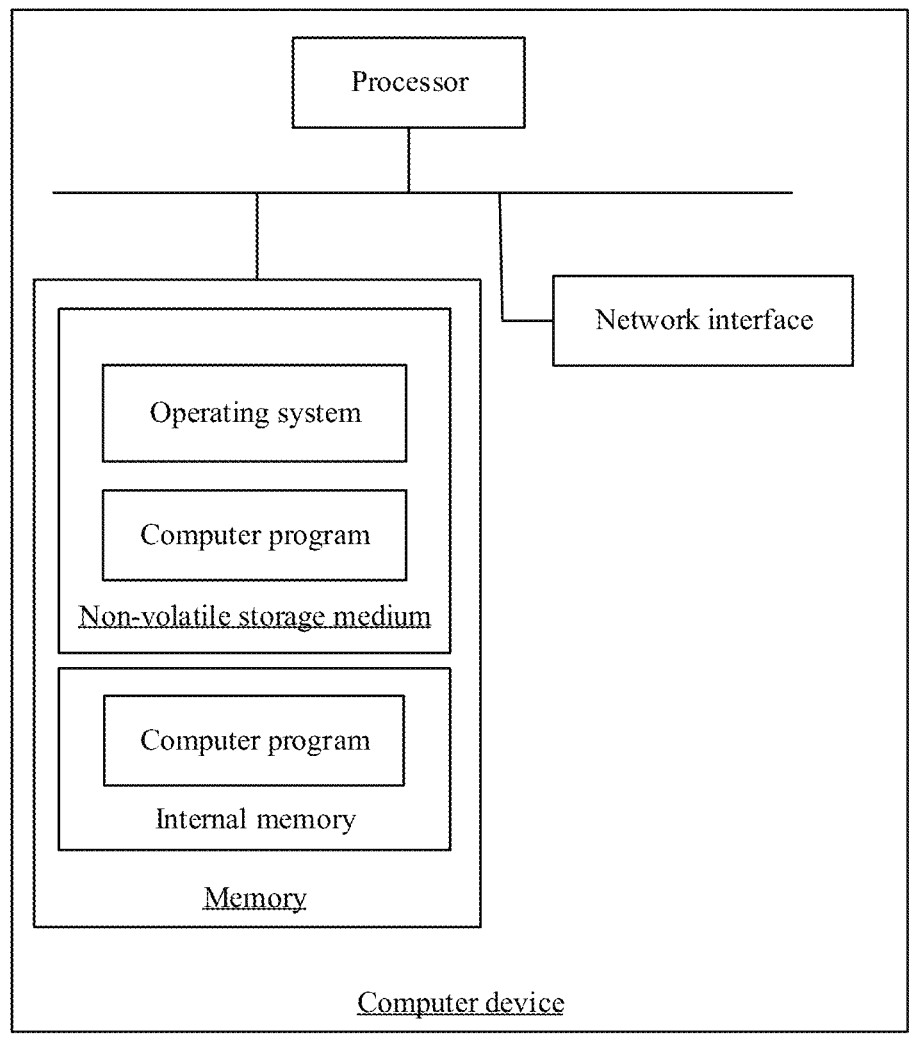
FIG. 21 is a structural block diagram of a computer device in an embodiment.

FIG. 21 is a diagram of an internal structure of a computer device in an embodiment. The computer device may be the server 120 in FIG. 1. As shown in FIG. 21, the computer device includes a processor, a memory, and a network interface connected by using a system bus. The memory includes a non-volatile storage medium and an internal memory. The non-volatile storage medium of the computer device stores an operating system, and may further store a computer program. The computer program, when executed by the processor, may cause the processor to perform the data processing method based on simultaneous interpretation. The internal memory may also store a computer program. The computer program, when executed by the processor, may cause the processor to perform the data processing method based on simultaneous interpretation.

A person skilled in the art may understand that, the structure shown in FIG. 21 is only a block diagram of a partial structure related to the solution of the present disclosure, and does not constitute a limitation to the computer device to which the solution of the present disclosure is applied. Specifically, the computer device may include more or fewer components than those shown in the figure, or some components may be combined, or a different component deployment may be used.

In an embodiment, the data processing apparatus based on simultaneous interpretation provided in the present disclosure may be implemented in a form of a computer program, and the computer program may run on the computer device shown in FIG. 21. The memory of the computer device may store program modules forming the data processing apparatus based on simultaneous interpretation, for example, the obtaining unit 1702, the processing module 1704, the transmitting module 1706, the receiving module 1708, the determining module 1712, and the update module 1710 shown in FIG. 17. The computer program formed by the program modules causes the processor to perform the steps of the data processing method based on simultaneous interpretation described in the embodiments of the present disclosure in this specification.

For example, the computer device shown in FIG. 21 may perform S202 by using the obtaining unit 1702 of the data processing apparatus based on simultaneous interpretation shown in FIG. 17. The computer device may perform S204 by using the processing module 1704. The computer device may perform S206 by using the transmitting module 1706. The computer device may perform S208 by using the receiving module 1708. The computer device may perform S210 by using the update module 1710.

In an embodiment, a computer device is provided, including a memory and a processor, the memory storing a computer program, the computer program, when executed by a processor of the computer device, causing the processor to perform the foregoing data processing method based on simultaneous interpretation executed by the server 120 in FIG. 1.

In an embodiment, a computer-readable storage medium is provided, storing a computer program, the computer program, when executed by a processor of a computer device, causing the processor to perform the foregoing data processing method based on simultaneous interpretation executed by the server 120 in FIG. 1.

Figure 22:
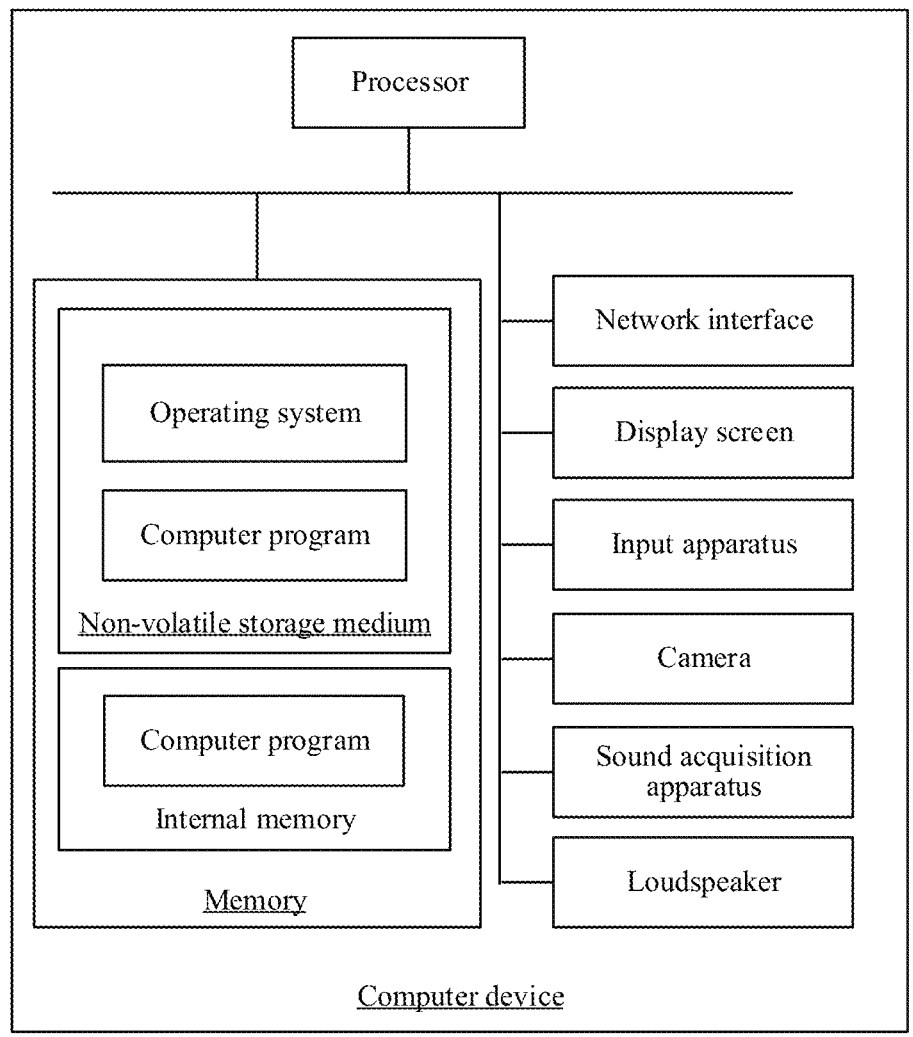
FIG. 22 is a structural block diagram of a computer device in another embodiment.

FIG. 22 is a diagram of an internal structure of a computer device in an embodiment. The computer device may be the user terminal 110 in FIG. 1. As shown in FIG. 22, the computer device includes a processor, a memory, a network interface, an input apparatus and a display screen that are connected by using a system bus. The memory includes a non-volatile storage medium and an internal memory. The non-volatile storage medium of the computer device stores an operating system, and may further store a computer program. The computer program, when executed by the processor, may cause the processor to perform the data processing method based on simultaneous interpretation. The internal memory may also store a computer program.

The computer program, when executed by the processor, may cause the processor to perform the data processing method based on simultaneous interpretation. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, a touchpad, a mouse or the like.

A person skilled in the art may understand that, the structure shown in FIG. 22 is only a block diagram of a partial structure related to the solution of the present disclosure, and does not constitute a limitation to the computer device to which the solution of the present disclosure is applied. Specifically, the computer device may include more or fewer components than those shown in the figure, or some components may be combined, or a different component deployment may be used.

In an embodiment, the data processing apparatus based on simultaneous interpretation provided in the present disclosure may be implemented in a form of a computer program, and the computer program may run on the computer device shown in FIG. 22. The memory of the computer device may store program modules forming the data processing apparatus based on simultaneous interpretation, for example, the first display module 1902, the receiving module 1904, the second display module 1906, the obtaining unit 1908, and the transmitting module 1910 shown in FIG. 19. The computer program formed by the program modules causes the processor to perform the steps of the data processing method based on simultaneous interpretation described in the embodiments of the present disclosure in this specification.

For example, the computer device shown in FIG. 22 may perform S802 by using the first display module 1902 of the data processing apparatus based on simultaneous interpretation shown in FIG. 19. The computer device may perform S804 by using the receiving module 1904. The computer device may perform S806 by using the second display module 1906. The computer device may perform S808 by using the obtaining unit 1908. The computer device may perform S810 by using the transmitting module 1910.

In an embodiment, a computer device is provided, including a memory and a processor, the memory storing a computer program, the computer program, when executed by a processor of the computer device, causing the processor to perform the foregoing data processing method based on simultaneous interpretation executed by the user terminal 110 in FIG. 1.

In an embodiment, a computer-readable storage medium is provided, storing a computer program, the computer program, when executed by a processor of the computer device, causing the processor to perform the foregoing data processing method based on simultaneous interpretation executed by the user terminal 110 in FIG. 1.

A person of ordinary skill in the art may understand that some or all procedures in the method in the foregoing embodiments may be implemented by a computer program instructing related hardware. The program may be stored in a non-volatile computer-readable storage medium, and when the program is executed, the procedures in the foregoing method embodiments may be implemented. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of the present disclosure, and descriptions thereof are in detail, but are not to be understood as a limitation to the patent scope of the present disclosure. A person of ordinary skill in the art may further make variations and improvements without departing from the ideas of the present disclosure, and the variations and improvements shall fall within the protection scope of the present disclosure. Therefore, the protection scope of the patent of the present disclosure shall be subject to the appended claims.

What is claimed is:

1. A data processing method, applied to a server in an interpretation system, the method comprising:

obtaining audio transmitted by an interpretation device;

processing the audio by using an interpretation model to obtain an initial text;

transmitting the initial text to a first user terminal and a second user terminal to be respectively displayed on a first interpretation auxiliary page and a second interpretation auxiliary page;

receiving a first modified text fed back by the first user terminal and a second modified text fed back by the second user terminal, the first modified text being obtained after the first user terminal modifies the initial text based on the first interpretation auxiliary page, and the second modified text being obtained after the second user terminal modifies the initial text based on the second interpretation auxiliary page;

determining a weighted cumulative value S based on a weight q1 corresponding to an identifier of the first user terminal, a weight q2 corresponding to an identifier of the second user terminal, a number of times t1 of text modification corresponding to the first user terminal, and a number of times t2 of text modification corresponding to the second user terminal, wherein the weighted cumulative value S includes a sum of t1 multiplies q1 and t2 multiplies q2;

determining the weighted cumulative value S is greater than a threshold;

in response to determining the weighted cumulative value S being greater than the threshold, updating the interpretation model according to the initial text, the first modified text, and the second modified text;

generating a modified text based on the updated interpretation model, and automatically assigning a sequence number to the modified text to be the same as a sequence number of the initial text; and sending the modified text and the corresponding sequence number to a user terminal;

wherein the sequence number indicates an arrangement or a storage position of the initial text, for the user terminal to locally search and replace the initial text with the modified text.

2. The method according to claim 1, wherein the processing the audio comprises:
  performing noise reduction processing on the audio; and
  using the interpretation model to obtain the initial text after performing the noise reduction processing.

3. The method according to claim 1, wherein the interpretation model comprises a universal voice model and an auxiliary voice model, and processing the audio comprises:
  performing, using the universal voice model, speech recognition on the audio to obtain a recognized text; and
  updating the recognized text by using the auxiliary voice model to obtain a recognition update text, the initial text comprising at least one of the recognized text and the recognition update text; and
  updating the interpretation model according to the initial text and the modified text comprises: updating the auxiliary voice model according to the initial text and the modified text.

4. The method according to claim 1, wherein the interpretation model comprises a translation model, the initial text comprises a translation text, and the modified text comprises a modified translation text; and the updating the interpretation model comprises:
  updating the translation model according to the translation text and the modified translation text.

5. The method according to claim 1, wherein the method further comprises:
  receiving a video transmitted by the interpretation device and corresponds to the audio; and
  embedding the initial text into the video; and the transmitting the initial text to the user terminal comprises:
  transmitting the video embedded with the initial text to the user terminal.

6. The method according to claim 1, wherein the audio corresponds to a group identifier; the transmitting the initial text comprises:
  transmitting the initial text to the user terminal accessing via the group identifier.

7. The method according to claim 1, wherein the audio corresponds to a group identifier; and the method further comprises: storing the initial text and the group identifier.

8. The method according to claim 1, further comprising:
  obtaining a voice component from the audio;
  obtaining, from the voice component, an audio component whose energy value is greater than or equal to an energy threshold; and
  processing the audio component by using the interpretation model to obtain the initial text.

9. The method according to claim 1, wherein the first user terminal and the second user terminal both correspond to a conference number, and the method further comprises:
  creating a document;
  adding the initial text to the document; and
  establishing a mapping relationship between the document and the conference number.

10. The method according to claim 1, further comprising:
  detecting accuracy rates of the text modifications;
  increasing the weight q1 in response to determining that the accuracy rate of the text modification corresponding to the first terminal reaches a modification accuracy threshold and that the number of times t1 of the text modification corresponding to the first terminal reaches the modification times threshold; and
  increasing the weight q2 in response to determining that the accuracy rate of the text modification corresponding to the second terminal reaches the modification accuracy threshold and that the number of times t2 of the text modification corresponding to the second terminal reaches the modification times threshold.

11. The method according to claim 1, wherein the number of times t1 that the first user terminal performs the text modification is an integer greater than 1, and each time of the t1 times that the text modification performed by the first user terminal contributes to the weighted cumulative value S is the same weight q1.

12. The method according to claim 1, further comprising:
  transmitting, to the first user terminal, a simultaneous interpretation auxiliary page configuration file corresponding to a child application identifier of a child application, the child application being implemented in an environment provided by a parent application run on the first user terminal, wherein the simultaneous interpretation auxiliary page configuration file is for configuring the first interpretation auxiliary page presented by the child application on the first user terminal.

13. A computer device, comprising a memory and a processor, the memory storing a computer program, the computer program, when executed by the processor, causing the processor to perform:
  transmitting the initial text to a first user terminal and a second user terminal to be respectively displayed on a first interpretation auxiliary page and a second interpretation auxiliary page;
  receiving a first modified text fed back by the first user terminal and a second modified text fed back by the second user terminal, the first modified text being obtained after the first user terminal modifies the initial text based on the first interpretation auxiliary page, and the second modified text being obtained after the second user terminal modifies the initial text based on the second interpretation auxiliary page;
  determining a weighted cumulative value S based on a weight q1 corresponding to an identifier of the first user terminal, a weight q2 corresponding to an identifier of the second user terminal, a number of times t1 of text modification corresponding to the first user terminal, and a number of times t2 of text modification corresponding to the second user terminal, wherein the weighted cumulative value S includes a sum of t1 multiplies q1 and t2 multiplies q2;
  determining the weighted cumulative value S is greater than a threshold;
  in response to determining the weighted cumulative value S being greater than the threshold, updating the interpretation model according to the initial text, the first modified text, and the second modified text;
  generating a modified text based on the updated interpretation model, and automatically assigning a sequence number to the modified text to be the same as a sequence number of the initial text; and
  sending the modified text and the corresponding sequence number to a user terminal;
  wherein the sequence number indicates an arrangement or a storage position of the initial text, for the user terminal to locally search and replace the initial text with the modified text.

14. The device according to claim 13, wherein the processor is further configured to perform:

performing noise reduction processing on the audio; and
using the interpretation model to obtain the initial text after performing the noise reduction processing.

15. The device according to claim 13, wherein the interpretation model comprises a universal voice model and an auxiliary voice model, and the processing the audio comprises:
   performing, using the universal voice model, speech recognition on the audio to obtain a recognized text; and
   updating the recognized text by using the auxiliary voice model to obtain a recognition update text, the initial text comprising at least one of the recognized text and the recognition update text; and the updating the interpretation model according to the initial text and the modified text comprises: updating the auxiliary voice model according to the initial text and the modified text.

16. The device according to claim 13, wherein the interpretation model comprises a translation model, the initial text comprises a translation text, and the modified text comprises a modified translation text; and the updating the interpretation model comprises:
   updating the translation model according to the translation text and the modified translation text.

17. The device according to claim 13, wherein the processor is further configured to perform:
   receiving a video transmitted by the interpretation device and corresponds to the audio; and
   embedding the initial text into the video; and the transmitting the initial text to the user terminal comprises:
   transmitting the video embedded with the initial text to the user terminal.

18. The device according to claim 13, wherein the audio corresponds to a group identifier; the transmitting the initial text comprises:
   transmitting the initial text to the user terminal accessing via the group identifier.

19. The device according to claim 13, wherein the audio corresponds to a group identifier; and the processor is further configured to perform:
   storing the initial text and the group identifier.

20. A non-transitory storage medium, storing a computer program, the computer program, when executed by a processor, causing the processor to perform:
   obtaining audio transmitted by an interpretation device;
   processing the audio by using an interpretation model to obtain an initial text;
   transmitting the initial text to a first user terminal and a second user terminal to be respectively displayed on a first interpretation auxiliary page and a second interpretation auxiliary page;
   receiving a first modified text fed back by the first user terminal and a second modified text fed back by the second user terminal, the first modified text being obtained after the first user terminal modifies the initial text based on the first interpretation auxiliary page, and the second modified text being obtained after the second user terminal modifies the initial text based on the second interpretation auxiliary page;
   determining a weighted cumulative value S based on a weight q1 corresponding to an identifier of the first user terminal, a weight q2 corresponding to an identifier of the second user terminal, a number of times t1 of text modification corresponding to the first user terminal, and a number of times t2 of text modification corresponding to the second user terminal, wherein the weighted cumulative value S includes a sum of t1 multiplies q1 and t2 multiplies q2;
   determining the weighted cumulative value S is greater than a threshold;
   in response to determining the weighted cumulative value S being greater than the threshold, updating the interpretation model according to the initial text, the first modified text, and the second modified text;
   generating a modified text based on the updated interpretation model, and automatically assigning a sequence number to the modified text to be the same as a sequence number of the initial text; and
   sending the modified text and the corresponding sequence number to a user terminal;
   wherein the sequence number indicates an arrangement or a storage position of the initial text, for the user terminal to locally search and replace the initial text with the modified text.

* * * * *